United States Patent
Ahuja et al.

(10) Patent No.: US 10,484,418 B2
(45) Date of Patent: Nov. 19, 2019

(54) SYSTEMS AND METHODS FOR UPDATING SECURITY POLICIES FOR NETWORK TRAFFIC

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US)

(73) Assignee: SHIELDX NETWORKS, INC., San Jose, CA (US)

( * ) Notice: Subject to any disclaimer, the term of this patent is extended or adjusted under 35 U.S.C. 154(b) by 138 days.

(21) Appl. No.: 15/606,468

(22) Filed: May 26, 2017

(65) Prior Publication Data

US 2018/0343281 A1 Nov. 29, 2018

(51) Int. Cl.
*H04L 29/06* (2006.01)

(52) U.S. Cl.
CPC ........ *H04L 63/1441* (2013.01); *H04L 63/105* (2013.01); *H04L 63/1408* (2013.01); *H04L 63/1425* (2013.01); *H04L 63/20* (2013.01)

(58) Field of Classification Search
CPC ............... H04L 63/105; H04L 63/1408; H04L 63/1425; H04L 63/1441; H04L 63/20
See application file for complete search history.

(56) References Cited

U.S. PATENT DOCUMENTS

2016/0269442 A1* 9/2016 Shieh ............... H04L 63/20

OTHER PUBLICATIONS

ETSI GS NFV-EVE 003 VI.1.1 (Jan. 2016), "Network Functions Virtualisation (NFV); Ecosystem; Report on NFVI Node Physical Architecture Guidelines for Multi-Vendor Environment," Group Specification, European Telecommunications Standards Institute (ETSI), Jan. 1, 2016,47 pages. (Year: 2016).*
Sun Y., et al., "Security-as-a-service for Microservices-Based Cloud Applications," IEEE 7th Intematinal Conference )n Cloud Computing Technology and Science (CLOUDCOM), Nov. 30, 2015, pp. 50-57. (Year: 2015).*
ETSI GS NFV-EVE 003 V1.1.1 (Jan. 2016), "Network Functions Virtualisation (NFV); Ecosystem; Report on NFVI Node Physical Architecture Guidelines for Multi-Vendor Environment," Group Specification, European Telecommunications Standards Institute (ETSI), Jan. 1, 2016, 47 pages.
International Search Report and Written Opinion for Application No. PCT/US2018/034752, dated Aug. 28, 2018, 15 pages.

(Continued)

*Primary Examiner* — Jason K Gee
*Assistant Examiner* — Ka Shan Choy
(74) *Attorney, Agent, or Firm* — Nicholson De Vos Webster & Elliott LLP

(57) ABSTRACT

Systems, methods, and apparatuses enable updating security policies in response to detecting attack activity or security threats. In an embodiment, security microservices detect attack activity sent between resources within an internal network. In response, the security microservices correlate the attack activity to externally accessible resources that were the initial entry point for the attack activity to the internal network. Based on this correlation, the security microservices update security policies bi-directionally to prevent the spread of future attack activity in the internal network between resources at a same level in the internal network and between resources at different levels in the internal network.

26 Claims, 16 Drawing Sheets

(56) References Cited

OTHER PUBLICATIONS

Sun Y., et al., "Security-as-a-service for Microservices-Based Cloud Applications," IEEE 7th International Conference on Cloud Computing Technology and Science (CLOUDCOM), Nov. 30, 2015, pp. 50-57.

* cited by examiner

SYSTEMS AND METHODS FOR UPDATING SECURITY POLICIES FOR NETWORK TRAFFIC

TECHNICAL FIELD

Embodiments described herein generally relate to network security. In particular, embodiments described herein generally relate to systems and methods for updating security policies for network traffic based on detecting activity.

BACKGROUND INFORMATION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A majority of businesses and other organizations today rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

Existing security applications determine if network traffic or activity directed from an external network poses a security threat to an internal network or to networked resources of the internal network. Existing security applications typically use rules to determine whether to allow or block network traffic from entering the internal network. However, existing security applications may not recognize some network activity as attack activity when it first reaches an externally accessible resource of a network. In these cases, existing security applications may permit this network activity to enter the internal network and pass to other resources in the internal network unchecked. Allowing the attack activity to spread to other resources of the internal networks can lead to many resources being placed in a compromised state.

A deficiency of existing security analysis methods can be attributed to the focus on "inside" vs. "outside" or secure vs. insecure. Devices typically seek to create a secure internal network by applying scanning and policies to traffic traversing the device boundary from an external environment. Even in the case of additional environments, such as demilitarized zones which straddle the secure and insecure networks, security devices act as border guards rather than surveillance networks. For this reason, existing security infrastructures are often fooled by new attacks and have difficulty analyzing behavior in real-time. Even systems that can detect some new attacks in a sandbox or isolated environments do so at the boundary and cannot extend that capability within the internal network.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
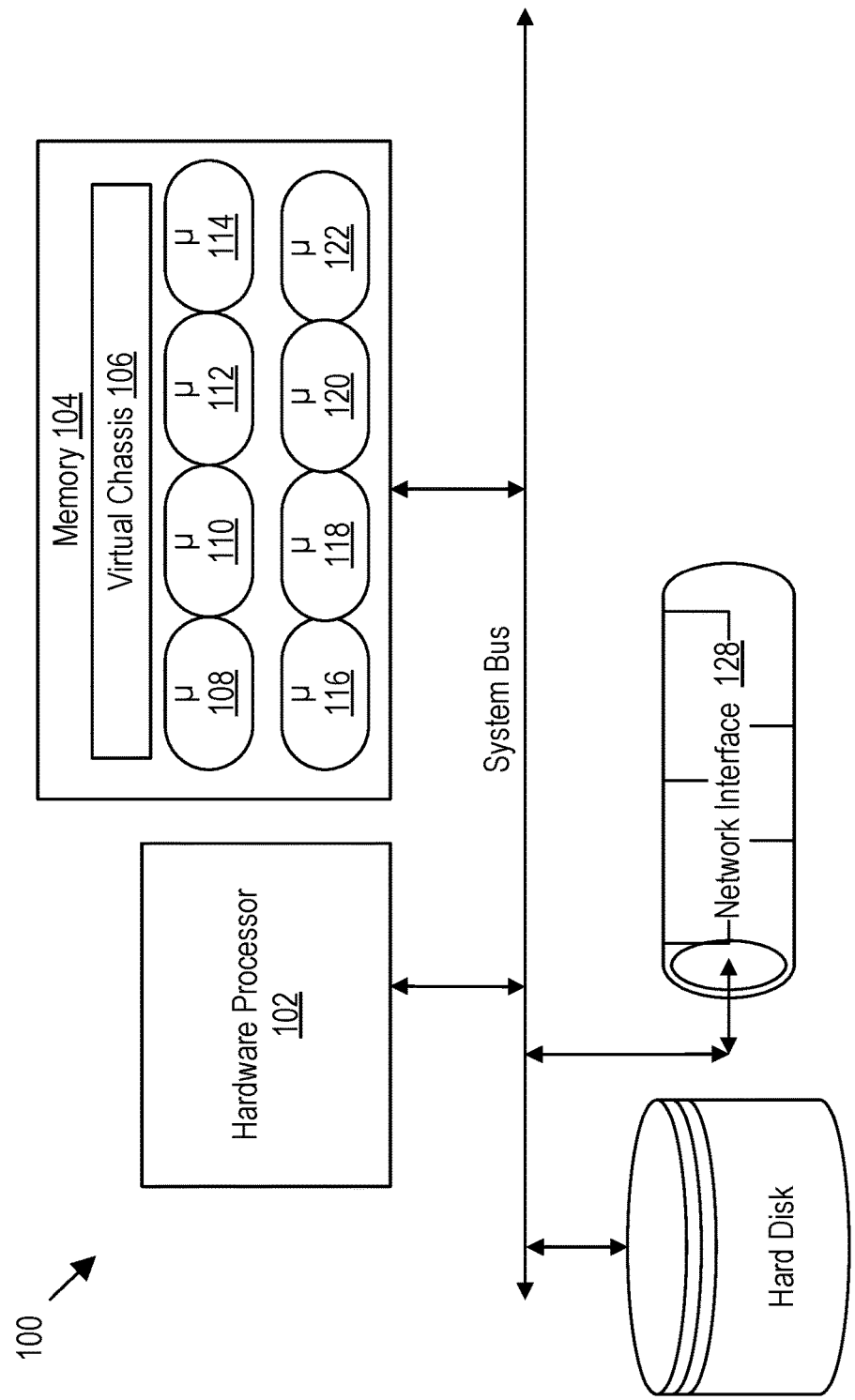
FIG. 1 is a block diagram illustrating computer hardware for loading network security system microservices from a memory and executing them by a processor in accordance with the disclosed embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

To address the deficiencies of existing security infrastructures, the embodiments extends the concept of trusted and untrusted networks to enable monitoring that spans application tiers of a hierarchy within a trusted network and peer groups of applications. By analyzing behaviors between application tiers and among application peers and recognizing associations of those behaviors, embodiments implement policies that recognize and potentially mitigate attacks that are attempting to cross, and/or have crossed, a traditional security perimeter.

Mitigating the risks of attack activity spreading through multiple resources of a network after an externally-facing resource is compromised typically involves monitoring and evaluating data traffic flowing within the network. Security microservices can be added by deploying interface microservices across resources so that even after attack activity enters the network, each of the security microservices detect and evaluate aspects of attack activity based on rules and the direction of the attack activity to other resources. In some embodiments, when one or more security microservices determine that data traffic indicates attack activity, the system can implement modifications to security policies to prevent the spread of future attacks. For example, when one or more security microservices detect attack activity being sent from one resource to another resource at a same level of a hierarchy of resources in an internal network, security policies can be implemented to promote changes bi-directionally, i.e., to future data traffic sent between resources at the same level of the hierarchy of resources, as well as to data traffic sent between resources at different levels of the hierarchy of resources. These security policy changes can include instantiating new a security microservice(s) and/or reconfiguring an existing security microservice(s).

Embodiments detailed herein update a security policy in response to detecting activity. In some embodiments, monitoring network traffic is performed using a plurality of microservices. The plurality of microservices detect that the monitored network traffic indicates the activity was directed to a first externally accessible resource at a first level of a hierarchy of resources in an internal network, and was directed from a second externally accessible resource at the first level of the hierarchy of resources. In response to detecting the network activity directed to the first externally accessible resources, the activity is correlated with the second externally accessible resources. This correlation may be performed by a microservice, or a plurality of microservices working together. In some embodiments, internally accessible resources at a second level of the hierarchy of resources associated with the second externally accessible resources at the first level of the hierarchy of resources are determined. A security policy associated with the internally accessible resources is then updated, where the security policy regards communications from externally accessible resources at the first level of the hierarchy of resources to the internally accessible resources at the second level of the hierarchy of resources. The updated security policy is then applied.

A hierarchy of resources refers to different functions of an overall service or capability and not relate only to complexity, sequentiality, or a single implementation property. As an example, in a three-tier infrastructure of a cloud-based service, the web tier, application tier, and database/storage tier would comprise three levels of a hierarchy. Traffic between two application tier services would comprise peer traffic of the same hierarchy level. Traffic between an application service and a database service would comprise traffic between hierarchy levels.

The terms "north-south" and "east-west" are used to illustrate communication as described in a diagram and are not specific to any industry convention, standard or other interpretation. As used hereinafter, north-south activity means activity between different hierarchy levels without specificity regarding those hierarchy levels such as logical positioning, deployment, coexistence within virtual or physical machines or similar distinction. As used hereinafter, the term east-west activity means activity between elements of the same hierarchy level without specificity regarding those hierarchy levels such as logical positioning, deployment, coexistence within virtual or physical machines or similar distinction.

In some embodiments, one or more microservices detect that the monitored network traffic indicates the activity was directed to internally accessible resources at a second level of a hierarchy of resources, and was directed from externally accessible resources at a first level of the hierarchy of resources. In response, the one or more microservices correlate the activity with the externally accessible resources. In some embodiments, the one or more microservices determine externally accessible resources at the first level of the hierarchy of resources associated with the internally accessible resources at the second level of a hierarchy of resources. The one or more microservices then update the security policy associated with the externally accessible resources, where the security policy regards communications between externally accessible resources. The one or more microservices then apply the updated security policy.

FIG. 1 is a block diagram illustrating computer hardware for loading network security microservices from a memory and executing them by a processor in accordance with the disclosed embodiments. Network security microservices 108-122 are stored in memory 104 (e.g., volatile memory such as Random Access Memory (RAM) and/or non-volatile memory such as disk) and executed by one or more hardware processors or processor cores 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, a network security system 100 utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices stored in memory 104. A network interface 128 (e.g., fabric or interconnect that is wired or wireless) provides a means for communicating with a data center. Network security system 100 may inspect traffic, detect threats, and otherwise protects a data center using the microservices 108-122.

Embodiments of a network security system 100 providing the above capabilities are now discussed in more detail. Network security system 100 adds security to, or enhances the security of, a datacenter or other computing environment. In an embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, a network security system 100 utilizes a network interface 128 to explore the datacenter and to discover existing network segments, determine security settings to apply to various network segments, detect available hosts and hardware resources, and determine additional configuration information as needed. In an embodiment, the datacenter itself includes several machines with hypervisors, or physical hardware, and the network security system 100 offers microservices to communicate with and protect one or more of those internal virtual machines or physical hardware. Based on performing datacenter discovery, a network security system 100, in some embodiments, may then offer or suggest available security tools for selection either through a graphical interface or via connections with existing enterprise management software. In one embodiment, once configured, a network security system 100 is deployed "in-line," receiving packets headed for the datacenter, thereby allowing network security system to intercept and block suspicious traffic before it reaches the datacenter. With an understanding of the datacenter, a network security system 100 deploys microservices to inspect traffic throughout the datacenter, and not only at ingress. In some embodiments, a network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In an embodiment, the microservices are small in size, consisting of a relatively small number of instructions. In an embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

In an embodiment, a network security system 100 receives traffic via network interface 128 to/from a datacenter. In one embodiment, a network security system 100 is placed in-line to inspect traffic, and potentially intercept a threat before it arrives at, or leaves, the datacenter. In other embodiments, a network security system 100 monitors the traffic heading into, or out of, the datacenter, in which case the network security system 100 detects threats and generates alerts, but does not block the data. A hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In an embodiment, microservices 108-122 are implemented using computer-executable instructions loaded from the Internet via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer-readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, a network security system 100 runs on a datacenter computer. In other embodiments, however, a network security system 100 is installed and runs on any one of a wide variety of computing platforms, ranging from low-cost to high-cost, and from low-power to high power. In some embodiments, a network security system 100 runs on a server. In some embodiments, a network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, a network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
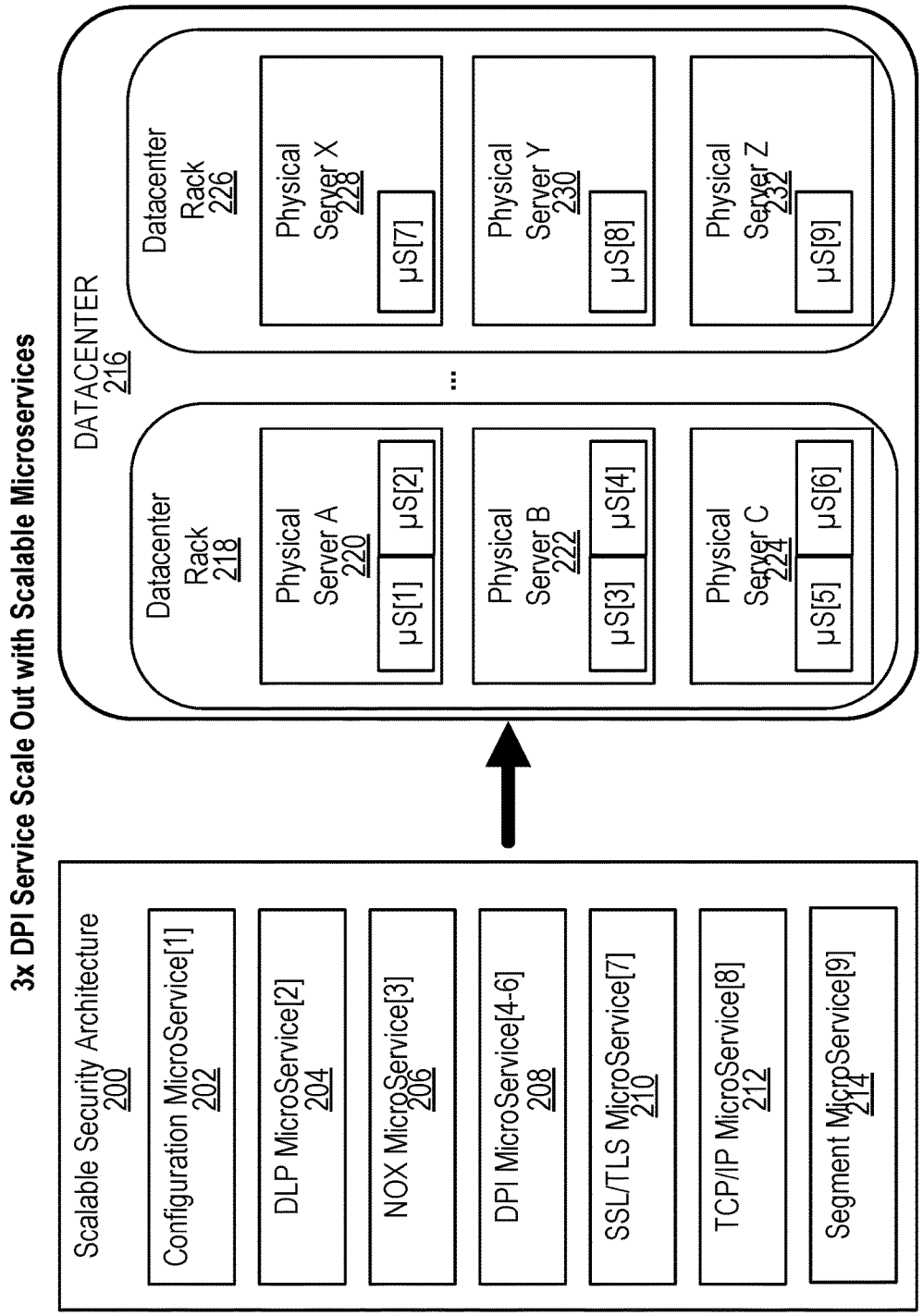
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each level of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
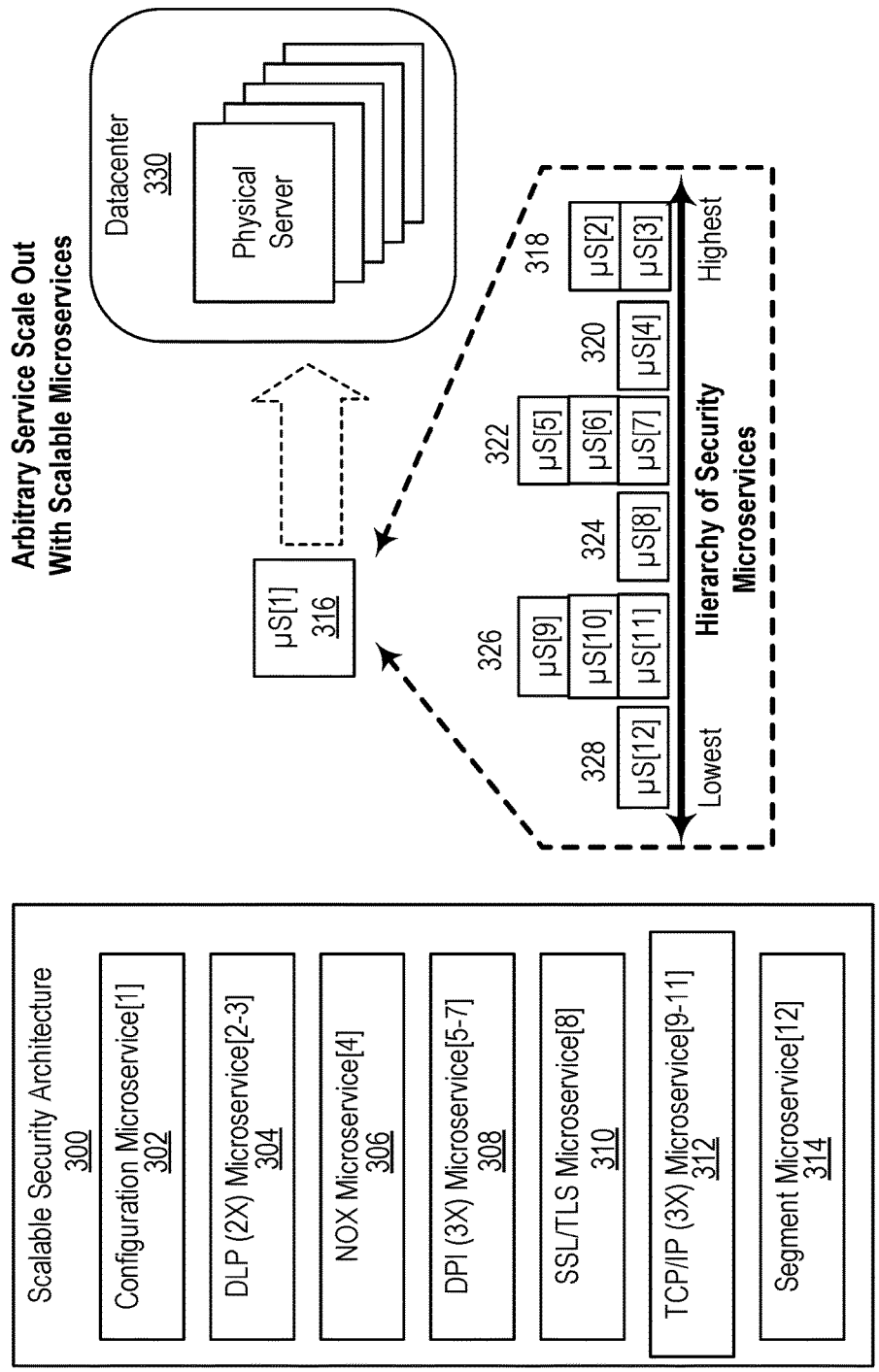
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane. The microservices, for example, may be implemented by physical servers in datacenter 330.

Figure 4:
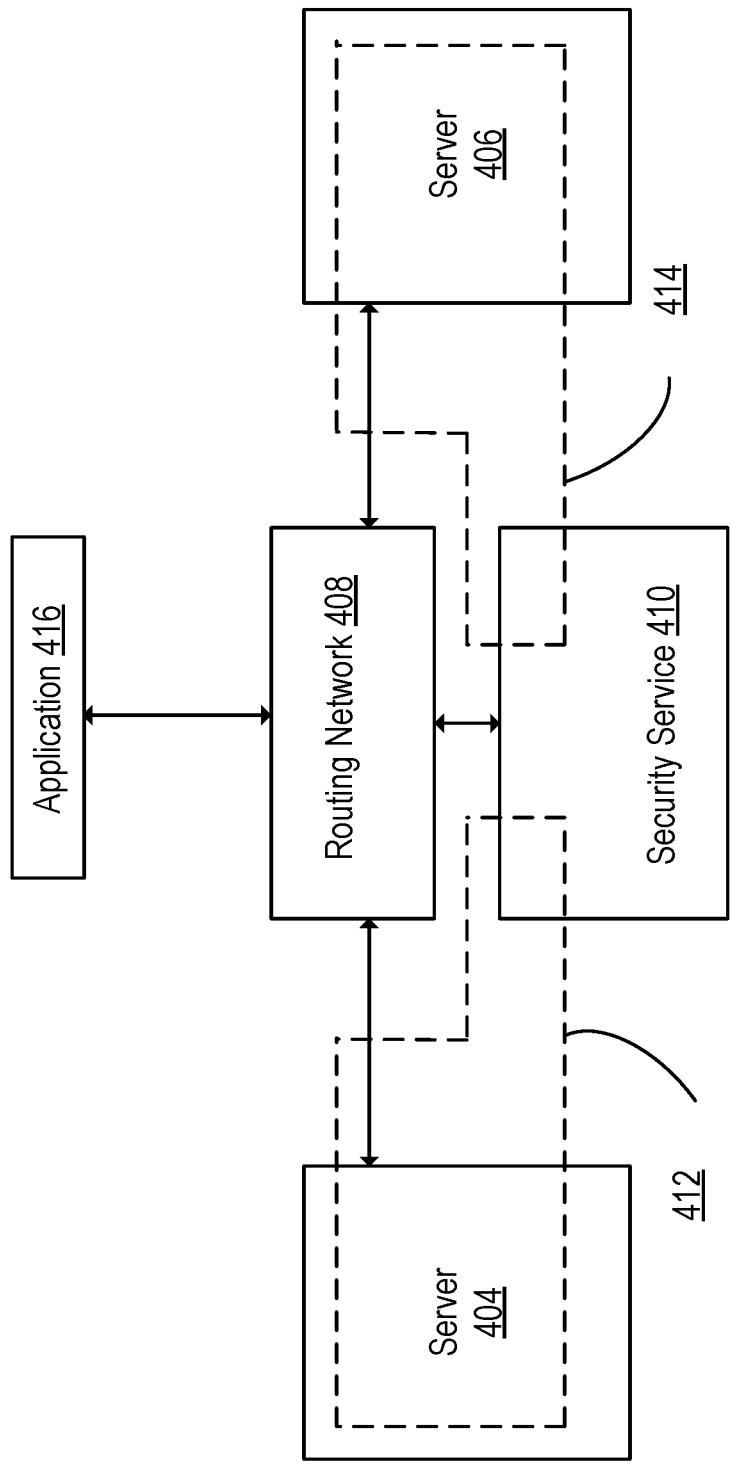
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. The security service 410 comprises one or more "microservices" used to monitor and perform various actions relative to data items (e.g. network traffic, files, email messages, etc.) sent to and received from one or more applications 416 and servers 404, 406. The microservices comprising security service 410 do not need to be confined to one physical server such as a server 404, 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404, 406, security service 410, and application 416 is deployed in a networked environment. Examples of networked environments include data centers, an on-premise stack, and a set of servers remotely connected using a network.

In an embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
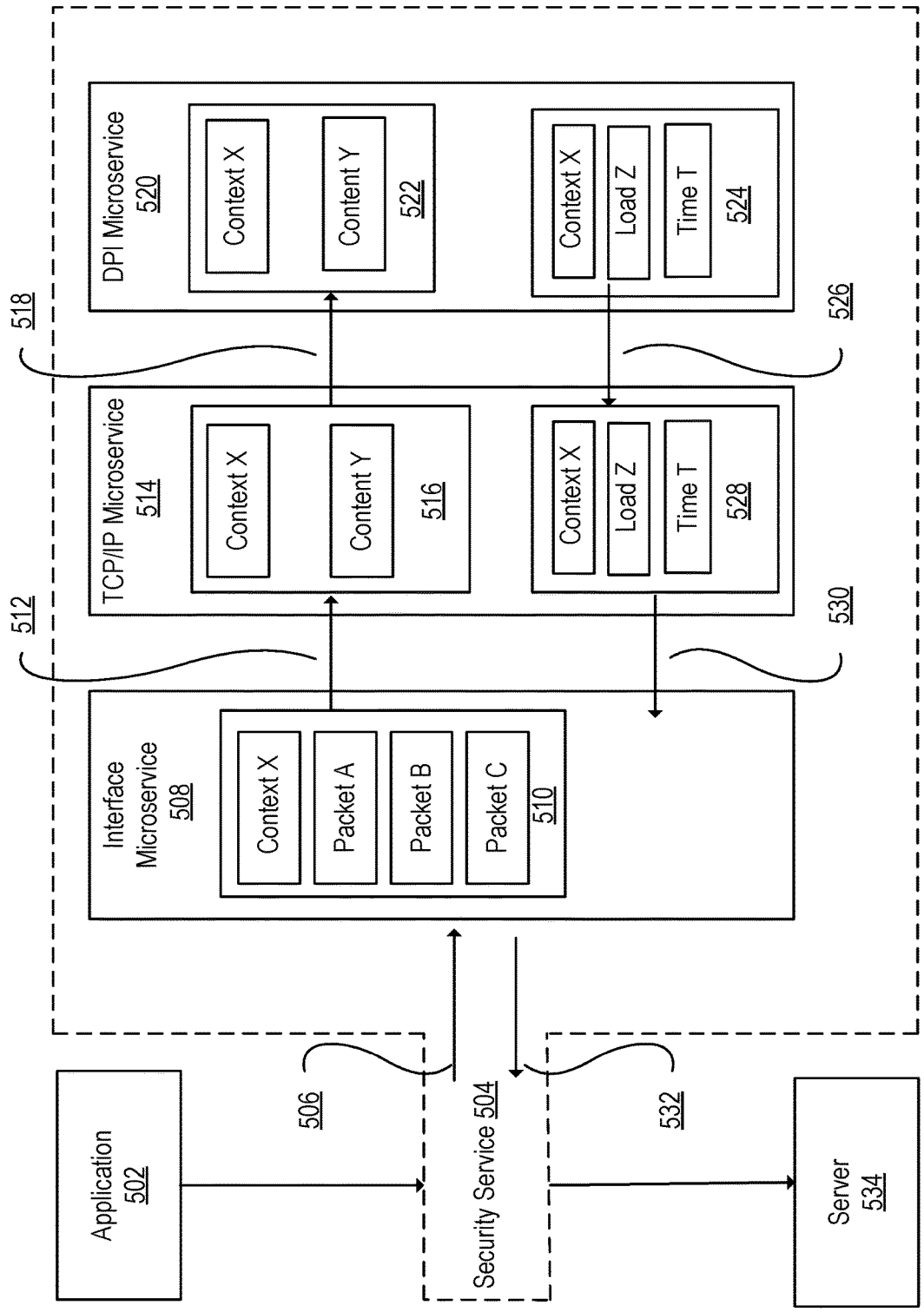
FIG. 5 is a block flow diagram illustrating application data traversing to a server after passing through a hierarchy of security microservices in accordance with the disclosed embodiments.

FIG. 5 is a block flow diagram illustrating application data traversing to a server after passing through a hierarchy of security microservices according to an embodiment. As illustrated, the flow begins with security service 504 receiving a network data packet from application 502. Security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service), or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via paths 526 and 530, the microservices receive and can maintain real-time loading and processing latency information utilized to make load balancing decisions.

Figure 6:
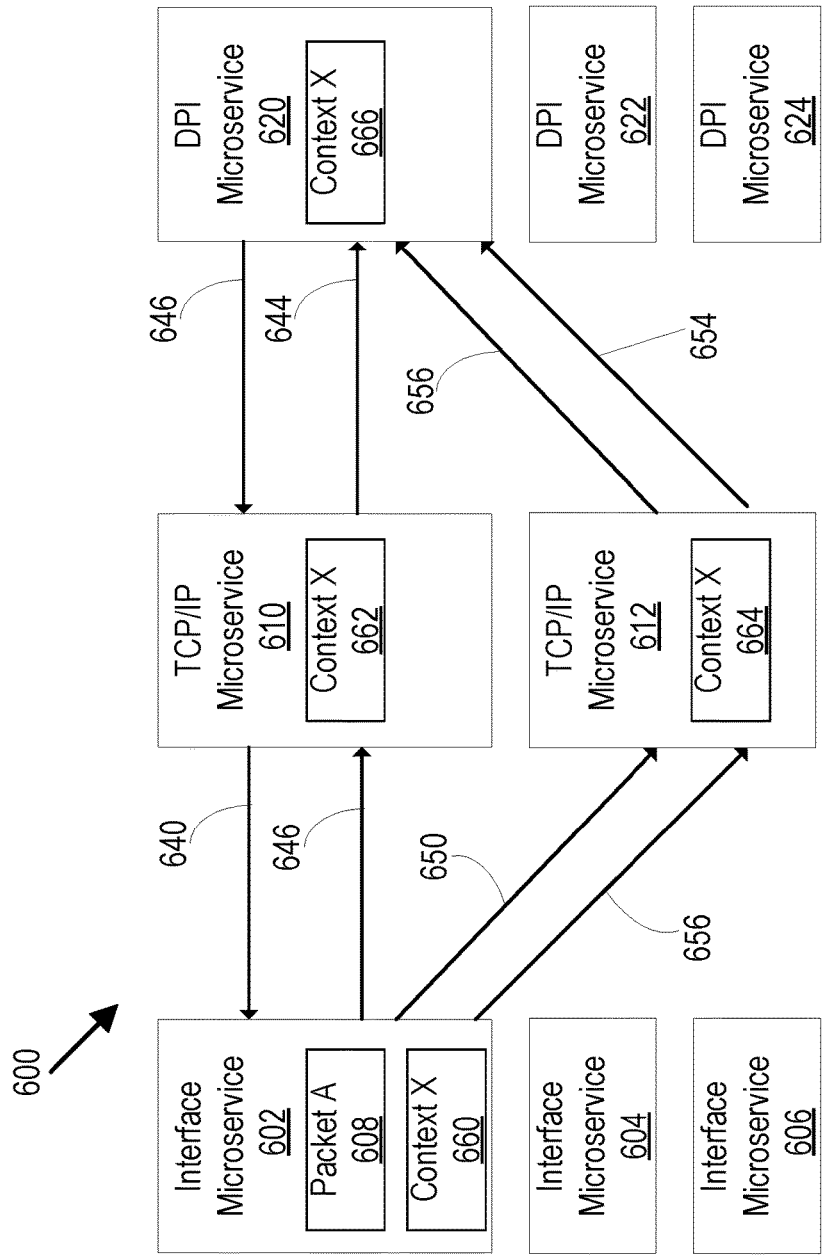
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices, different types microservice types, or both. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission 646. Context X 662, when transmitted to DPI microservice 620 as part of transmission 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, microservices in the same or different hierarchy level of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and also a state lookup or a context lookup, in addition to other information. Interface microservice 602 provides packet A 608 and context X 660 to TCP/IP microservice 610 or 612 via path 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data or the data resulting from the security processing to DPI microservice 620 via paths 644 or 656, respectively. Along with the transmitted data, TCP/IP microservice 610 or 612 forwards context X 662 or 664, respectively, to a DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via path 650. TCP/IP microservice 612 performs some security processing, then transmits the second packet and context X 664 to DPI microservice 620 via path 654. After performing some security processing, DPI microservice 620 responds to TCP/IP microservice 612 via path 654, and TCP/IP microservice responds to interface microservice 602 via path 656.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

Figure 7:
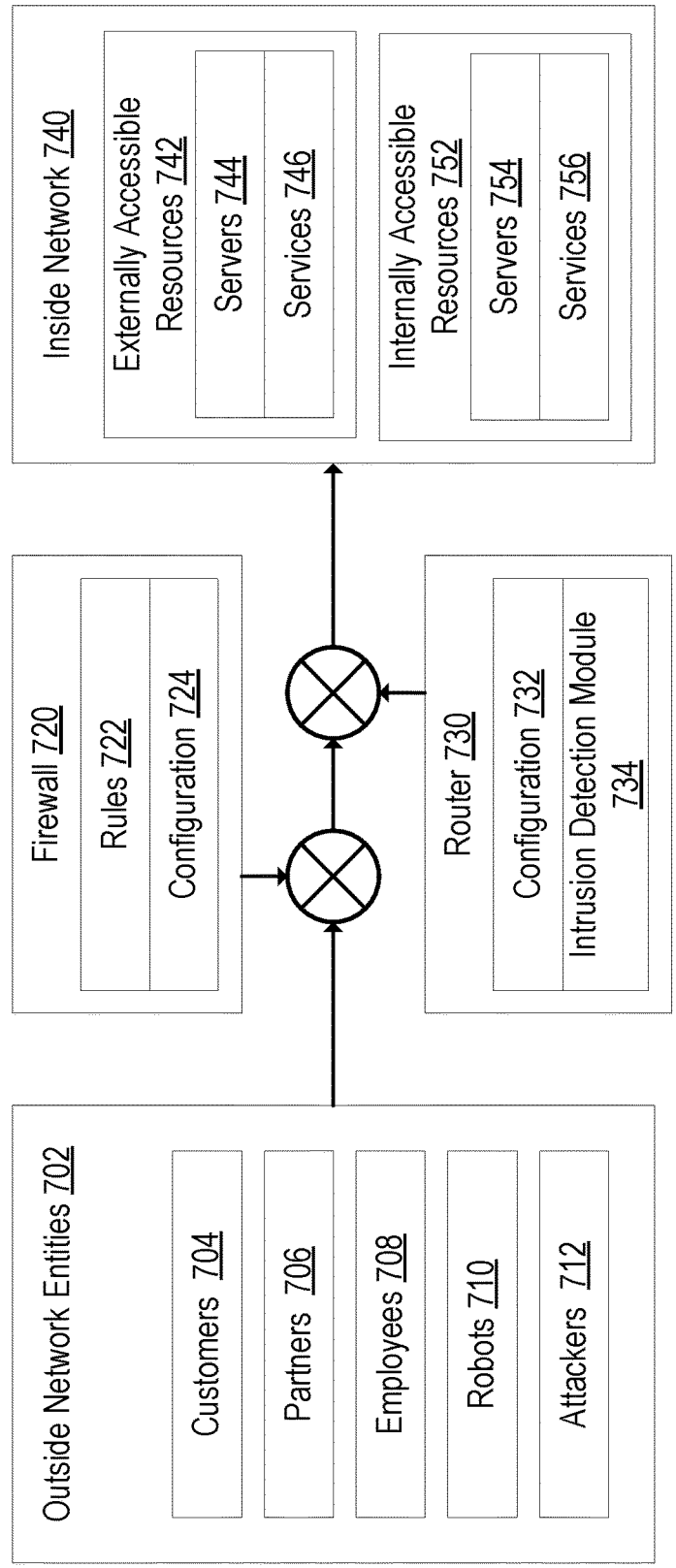
FIG. 7 illustrates a networked environment in accordance with the disclosed embodiments.

FIG. 7 illustrates a networked environment in accordance with the disclosed embodiments. Networked environment includes outside network entities 702 and inside network 740. In the embodiment depicted in FIG. 7, outside network entities 702 include customers 704, partners 706, employees 708, search robots 710, and attackers 712, representing users and systems that are attempting to access inside network 740. Inside network 740 includes one or more externally available resources 742 and one or more internally accessible resources 752. Externally accessible resources 742 include one or more server 744 and services 746. Examples of externally accessible resources 742 include a web server, an FTP site, and application servers. Internally accessible resources 752 include one or more server 754 and services 756. Examples of internally accessible resources 752 are resources that are not directly accessible from outside network 702.

In one embodiment, data transmitted from outside network 702 to inside network 740 is first intercepted by firewall 720 and router 730. In some embodiments, firewall 720 is a network security system that monitors and can evaluate network traffic sent from outside network 702 with inside network 740 as the destination. Firewall 720 includes rules 722 and configuration data 724 to perform these functionalities. In some embodiments, firewall 720 performs authentication process and/or allow access to authenticated requesters, while blocking access to unauthenticated requesters. For example, firewall 720 accesses a list of authorized IP addresses to determine if the source of network traffic is authorized to access inside network 740.

In one embodiment, after passing through firewall 720, router 730 intercepts the data transmitted from outside network 702. Router 730 includes configuration data 732 and intrusion detection module 734. In one embodiment, intrusion detection module 734 can influence routing and switching, e.g., directing data to the destination resource. In another embodiment, intrusion detection module 734 has enforcement capabilities to prevent access to the inside network 740 (e.g., stopping network traffic).

Figure 8:
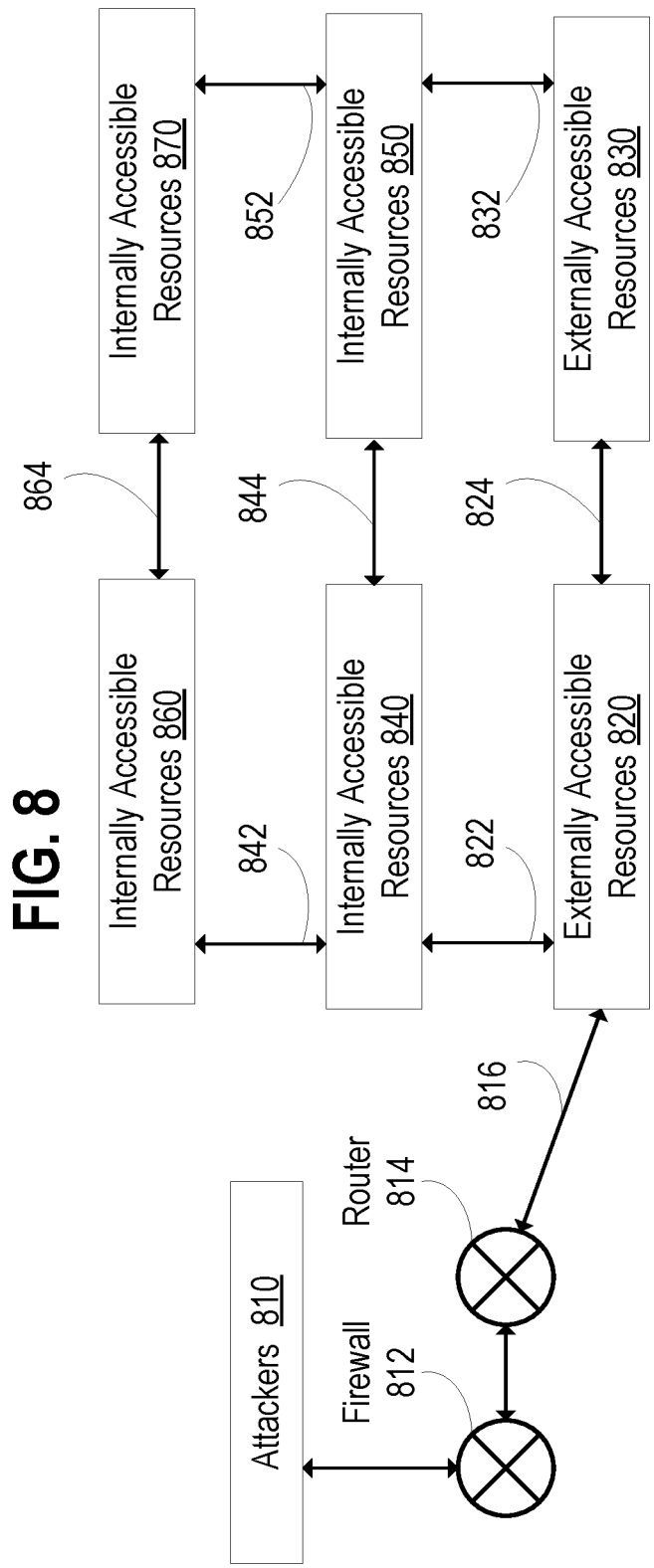
FIG. 8 illustrates the flow of attack activity sent by attackers through a networked environment.

FIG. 8 illustrates an embodiment of a flow of attack activity sent by attackers through networked environment. Attackers 810 transmit the attack activity to a network. For example, at an interface of the network, a firewall 812 receives traffic and directs the traffic to router 814, and across network connection 816 to externally accessible resources 820. In some embodiments, a firewall 812 is not utilized. Once attackers 810 have access to a resource within an inside network, attackers 810 can attempt to send activity to and compromise other resources in the inside network. For example, when attackers 810 have access to externally accessible resources 820, attackers 810 can use their access into the inside network to probe and access peers at the same level of the hierarchy of resources (e.g., other externally accessible resources) or resources at another level of the hierarchy of resources (e.g., resources that are only accessible internally). In one embodiment, the attack activity flows in a north-south direction 822 within the inside network, e.g., from externally accessible resources 820 at a first level of a hierarchy of resources to internally accessible resources 840 at a second level of the hierarchy of resources. In another embodiment, the attack activity flows in an east-west direction 824 within the inside network, e.g., from externally accessible resources 820 to externally accessible resources 830, both at the same level of the hierarchy of resources. From there, the attack activity can flow to other externally accessible resources or in the north-south direction 832 to internally accessible resources 850 at the second level of the hierarchy of resources.

FIG. 8 also depicts attack activity that traverses different internally accessible resources. In one embodiment, the attack activity flows in a north-south direction 842 within the inside network, e.g., from internally accessible resources 840 at a second level of a hierarchy of resources to internally accessible resources 860 at a third level of the hierarchy of resources. This attack activity may be associated with traffic to or from externally accessible resources 820. In another embodiment, the attack activity flows in a north-south direction 852 within the inside network, e.g., from internally accessible resources 850 at a second level of a hierarchy of resources to internally accessible resources 870 at a third level of the hierarchy of resources. This attack activity may be associated with traffic to, or from, externally accessible resources 820 or externally accessible resources 830. In another embodiment, the attack activity flows in an east-west direction 844 within the inside network, e.g., from internally accessible resources 840 at a second level of a hierarchy of resources to internally accessible resources 850 at the same of the hierarchy of resources. This attack activity may be associated with traffic to, or from, externally accessible resources 820. In another embodiment, the attack activity flows in an east-west direction 864 within the inside network, e.g., from internally accessible resources 860 at a third level of a hierarchy of resources to internally accessible resources 870 at the same level of the hierarchy of resources. This attack activity may be associated with traffic to or from externally accessible resources 820.

Figure 9:
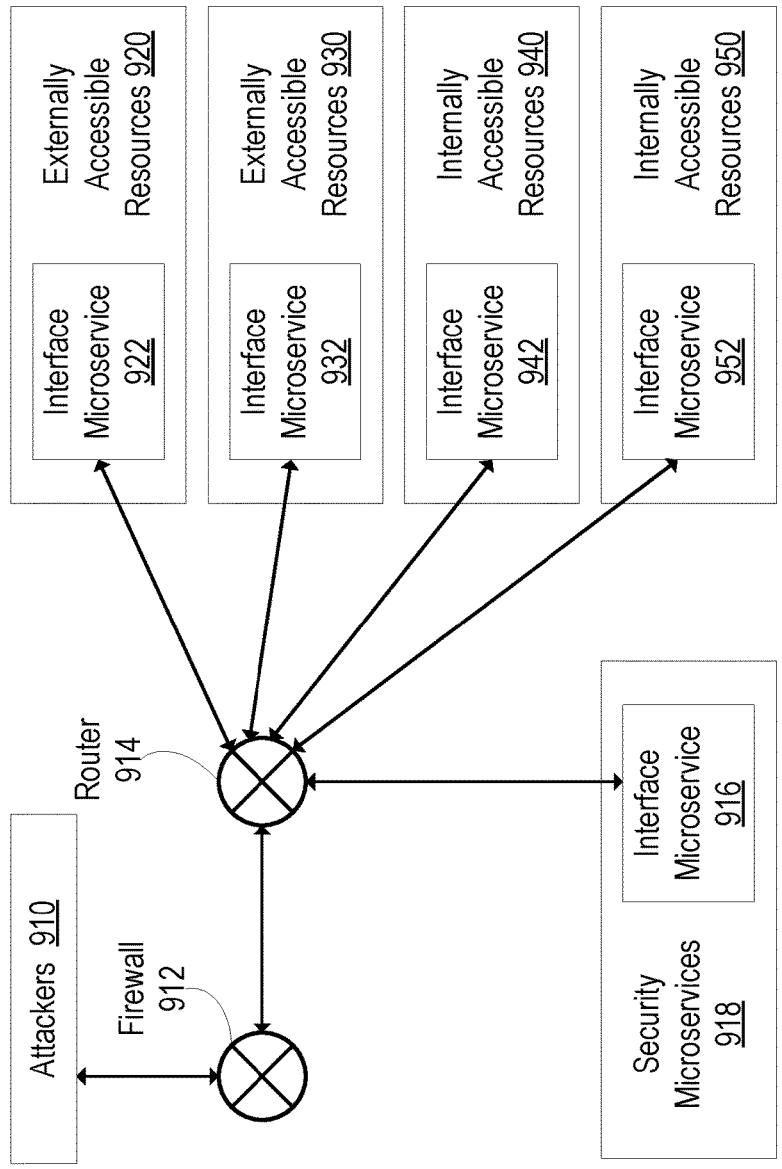
FIG. 9 illustrates interface microservices intercepting activity sent to networked environment in accordance with the disclosed embodiments.

FIG. 9 illustrates one or more interface microservices intercepting activity sent to networked environment and between elements of networked environment in accordance with the disclosed embodiments. The networked environment includes at least one security microservice 918 with at least one interface microservice 916. In addition, externally accessible resources 920 includes interface microservice 922, externally accessible resources 930 includes interface microservice 932, internally accessible resources 940 includes interface microservice 942, and internally accessible resources 950 includes interface microservice 952. In one embodiment, the one or more security microservices 918 operate externally from the resources, and intercepts and performs security services on network traffic received by the resources via the interface microservices 922, 932, 942 and 952. For example, an attacker (e.g., attackers 910) sends network traffic through firewall 912 and router 914, with externally accessible resources 920 as the intended destination. Interface microservice 922 intercepts the network traffic prior to externally accessible resources 920 receiving the network traffic. Interface microservice 922 re-directs the network traffic to interface microservice 916 for processing by the one or more security microservices 918. When externally accessible resources 920 communicates with other externally accessible resources or internally accessible resources, interface microservice 922 redirects this traffic to one or more security microservices 918 through one or more interface microservice 916.

In some embodiments, firewall 912 is optional. In some embodiments, router 914 is an externally configured entity. In some embodiments operating within cloud infrastructure, firewall 912 and router 914 are provided as software or infrastructure services or as an abstraction.

Figure 10:
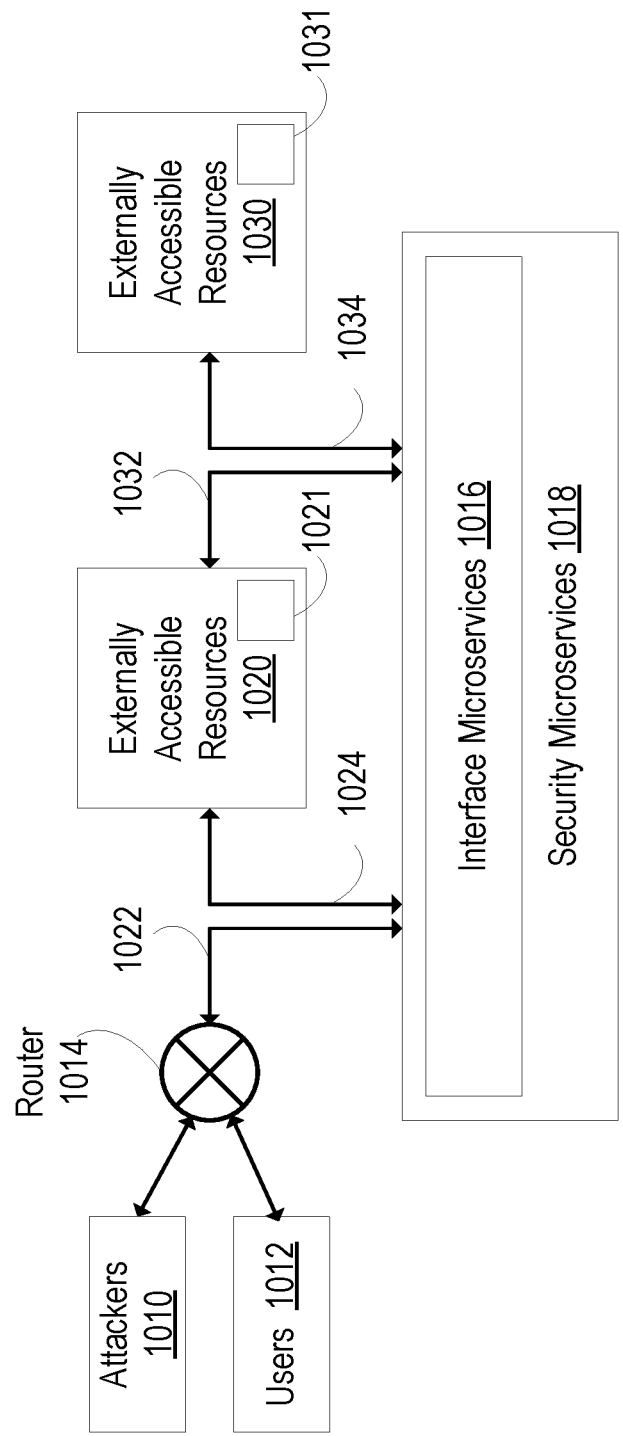
FIG. 10 illustrates security microservices intercepting east-west activity within networked environment in accordance with the disclosed embodiments.

FIG. 10 illustrates security microservices 1018 intercepting east-west activity within a networked environment in accordance with the disclosed embodiments. The networked environment includes router 1014, externally accessible resources 1020 and 1030, and one or more security microservices 1018. In one example, attackers 1010 send activity across the network to externally accessible resources 1020. Router 1014 intercepts and evaluates the activity to route the activity to the appropriate destination. When the activity passes through router 1014 into the inside network, because one or more interface microservices 1021 are loaded into externally accessible resources 1020, one or more security microservices 1018 intercept and perform one or more security services on the activity. In this scenario, one or more interface microservices 1021 in externally accessible resources 1020 send the activity across path 1022 to one or more security microservices 1018. When the activity passes through the analysis by one or more security microservices 1018, one or more security microservices 1018 send the activity back to externally accessible resources 1020 via path 1024. In this scenario, attackers 1010 now have access to externally accessible resources 1020, and can use the access to try to send the activity to additional externally accessible resources (e.g., 1030) across path 1032. However, because externally accessible resources 1030 also has one or more interface microservices 1031 linked to one or more security microservices 1018, the one or more interface microservices 1031 in externally accessible resources 1030 intercept the activity sent from externally accessible resources 1020 and sends the activity to one or more interface microservices 1016 to allow the one or more security microservices 1018 to perform security services on the activity. In another embodiment, when externally accessible resources 1020 attempt to send the activity to externally accessible resources 1030, one or more interface microservices 1021 in externally accessible resources 1020 intercept the activity and re-direct the activity to path 1032. Continuing the example, through the second evaluation by one or more security microservices 1018, the one or more security microservices 1018 determine that the activity is, in fact, attack activity and can indicate that externally accessible resources 1020 is compromised. When the one or more security microservices 1018 determine the activity is not attack activity, the activity continues to its destination, e.g., externally accessible resources 1030. Only in situations where the one or more security microservices 1018 determine there are no security issues with the traffic will the activity be sent across path 1034 to externally accessible resources 1030.

In one example, activity from attackers 1010 is indistinguishable from legitimate activity from users 1012 when directed to externally accessible resources 1020 and the one or more security microservices 1018 may not determine the activity to be attack activity. However, when attackers 1010 attempt to direct the activity from externally accessible resources 1020 to another externally accessible resources 1030, the one or more security microservices 1018, in a second evaluation, recognize that the direction of activity is irregular for the type of data traffic and flag the activity as not legitimate (e.g., attack activity). In this manner, the one or more security microservices 1018 determine the activity sent from externally accessible resources 1020 to externally accessible resources 1030 is attack activity, even if the one or more security microservices 1018 are not aware that externally accessible resources 1020 is compromised.

Figure 11:
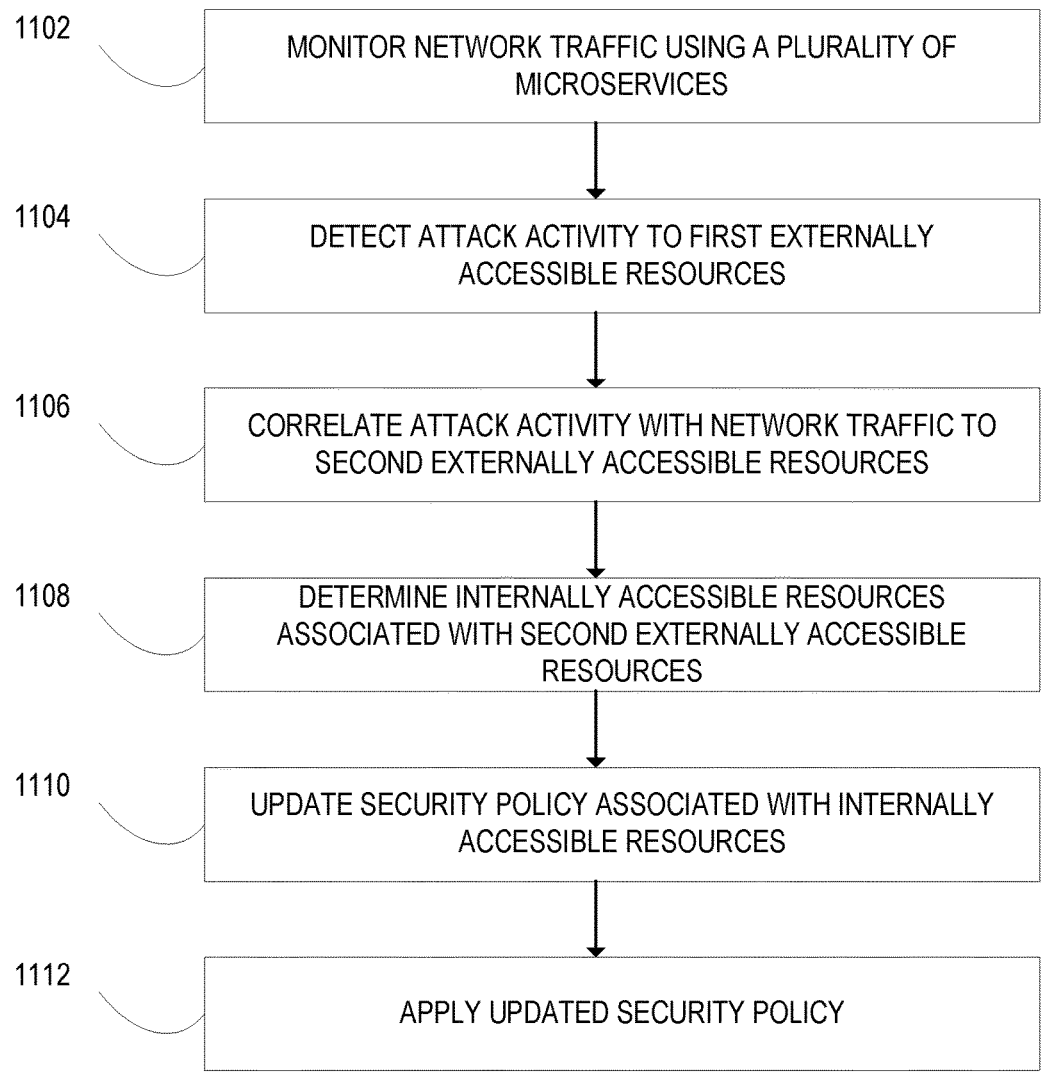
FIG. 11 is a flow diagram illustrating an example process for updating security policies in response to detecting activity through a networked environment in accordance with the disclosed embodiments.

FIG. 11 is a flow diagram illustrating an example process for updating security policies in response to detecting activity through a networked environment in accordance with an embodiment. For ease of understanding, the description of FIG. 11 below references components of the networked environment of FIG. 10, however, it is not limited to those components. Further, the actions below are performed by one or more security microservices and/or one or more interface microservices. As such, a single security microservice may perform an action, or two more security services may perform the action either independently, or in conjunction. At block 1102, one or more security microservices (e.g., one or more security microservices 1018) monitor network traffic throughout the networked environment. For example, one or more interface microservices 1021 in externally accessible resources 1020 intercept network traffic. The one or more interface microservices 1021 re-direct the network traffic to the one or more security microservices 1018 for evaluation. When the one or more security microservices 1018 do not detect any security policy violations with the network traffic, the one or more security microservices 1018 re-direct the network traffic back to externally accessible resources 1020.

At block 1104, one or more security microservices (e.g., one or more security microservices 1018) detect attack activity to externally accessible resources (for example, externally accessible resources 1030). In one embodiment, one or more security microservices detect attack activity sent from one externally accessible resource at a first level of a hierarchy of resources to another externally accessible resource, also at the first level of the hierarchy of resources. For example, one or more security microservices 1018 detect that network activity that passed through one or more security microservices 1018 to externally accessible resources 1020 is currently being directed to externally accessible resources 1030, where the type of network activity being sent is indicative of attack activity. In one example, the type of network activity is not typically sent between two externally accessible resources, and the occurrence is detected as an attack. In another example, the type of network activity violates a security policy regarding communications between externally accessible resources.

At block 1106, one or more security microservices (e.g., one or more security microservices 1018) correlate the attack activity with the network traffic to externally accessible resources (e.g., externally accessible resources 1020). For example, one or more security microservices 1018 determine an IP address, or other identifier, for the externally accessible resources 1020 as the initial point of entry of the attack activity to the networked environment. In one embodiment, one or more security microservices traverse a path of the attack activity through the networked environment to determine the externally accessible resources interfacing with an external network. Because the determined externally accessible resources was the first resource to interface with the external network, security microservices identify it as the source of the compromise to the networked environment.

In one embodiment, one or more security microservices (e.g., one or more security microservices 1018) indicate externally accessible resources (e.g., externally accessible resources 1020) as being in a compromised state. In one embodiment, one or more security microservices security microservices make this determination based on the flow of the attack activity to the externally accessible resources, even though the attack activity may have been previously allowed to pass to externally accessible resources in a previous analysis by one or more security microservices, for example as described above in block 1102.

In one embodiment, one or more security microservices (e.g., one or more security microservices 1018) determine additional externally accessible resources having the same configuration as externally accessible resources that sent the attack activity. In one embodiment, because one externally accessible resource is on the same hierarchical level as another externally accessible resource, one or more security microservices determine that the another externally accessible resources is susceptible to a similar attack and can be compromised in the same manner as externally available resources.

At block 1108, the one or more security microservices (e.g., one or more security microservices 1018) determine internally accessible resources that are associated with the externally accessible resources (e.g., 1020 and 1030). For example, the one or more security microservices 1018 determines the internally accessible resources that interact (e.g., send and receive data) with externally accessible resources 1020 and 1030, or additional externally accessible resources having the same configuration as externally accessible resources 1020 and 1030.

At block 1110, the one or more security microservices (e.g., one or more security microservices 1018) update a security policy associated with the internally accessible resources within the networked environment. The one or more security microservices, in response to detecting an east-west attack (e.g., attack activity directed between (externally) accessible resources at the same hierarchical level), updates security policies associated with internally accessible resources to reduce the risk of the attack activity spreading in the north-south direction (e.g., from a first level of the hierarchy of resources to a second level of the hierarchy of resources).

At block 1112, the one or more security microservices (e.g., one or more security microservices 1018) apply the security policy to the internally accessible resources. In one embodiment, application of security policy comprises configuring the security policy of one or more security microservices. In one embodiment, the application of security policy comprises reconfiguring an existing security microservice. In one embodiment, application of security policy comprises instantiating a new security microservice and configuring the new security microservice through the application of a security policy. Instantiating a new security microservice may include the instantiation and configuration of a new interface microservice.

In one embodiment, the one or more security microservices additionally update a security policy associated with network activity sent between externally accessible resources at the same hierarchical level.

Figure 12:
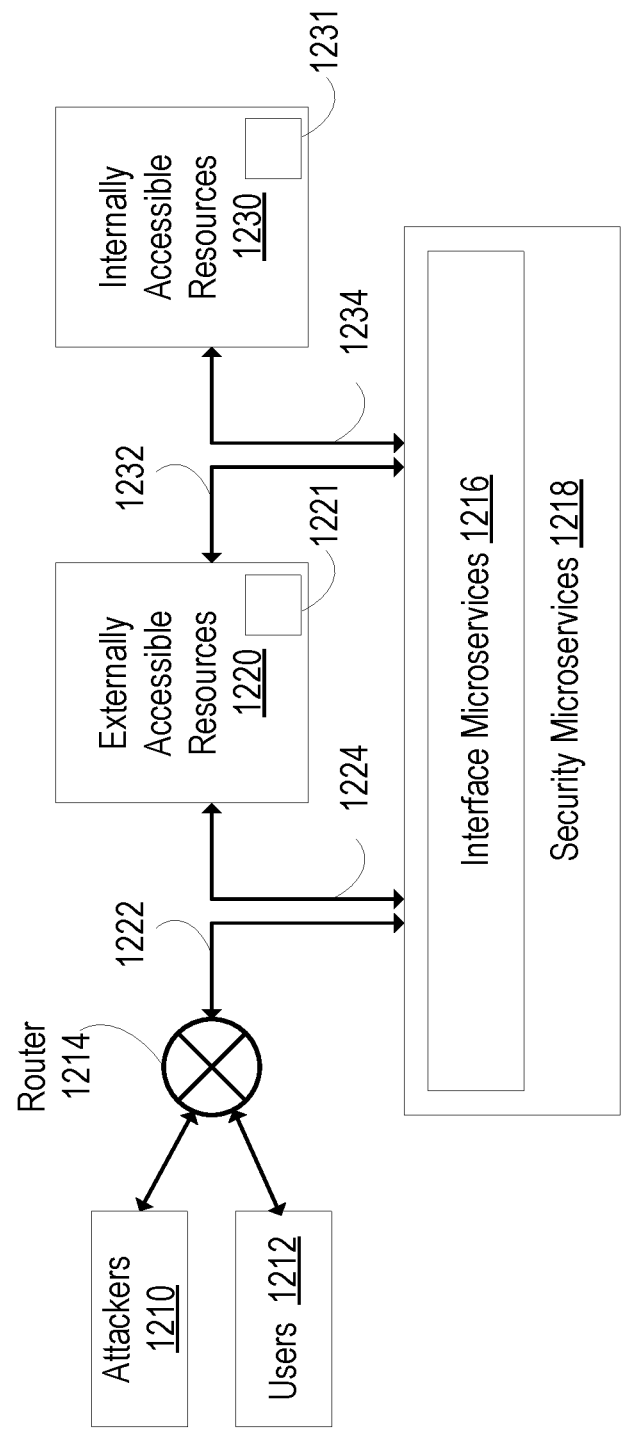
FIG. 12 illustrates security microservices intercepting north-south activity within networked environment in accordance with the disclosed embodiments.

FIG. 12 illustrates security microservices 1218 intercepting north-south activity within a networked environment in accordance with the disclosed embodiments. The networked environment includes router 1214, externally accessible resources 1220, internally accessible resources 1230, and one or more security microservices 1218. In one example, attackers 1210 send activity across the network to externally accessible resources 1220. Router 1214 intercepts and evaluates the activity to route the activity to the appropriate destination. When the activity passes through router 1214 into the inside network, because one or more interface microservices 1221 are loaded into externally accessible resources 1220, one or more security microservices 1218 intercept and perform one or more security services on the activity. In this scenario, one or more interface microservices 1221 in externally accessible resources 1220 send the activity across path 1222 to one or more security microservices 1218. When the activity passes through the analysis by one or more security microservices 1218, one or more security microservices 1218 send the activity back to externally accessible resources 1220 via path 1224. In this scenario, attackers 1210 now have access to externally accessible resources 1220, and can use the access to try to send the activity to internally accessible resources across path 1232. However, because internally accessible resources 1230 also has one or more interface microservices 1231 linked to security microservices 1218, the one or more interface microservices 1231 in internally accessible resources 1230 intercept the activity sent over path 1232 and send the activity to one or more interface microservices 1216 to allow the one or more security microservices 1218 to perform security services on the activity. In another embodiment, when externally accessible resources 1220 attempt to send the activity to internally accessible resources 1230, one or more interface microservices 1221 in externally accessible resources 1220 intercept the activity and re-direct the activity to path 1232. Continuing the example, through the second evaluation by one or more security microservices 1218, the one or more security microservices 1218 determine that the activity is, in fact, attack activity and can indicate that externally accessible resources 1220 is compromised. When the one or more security microservices 1218 determine the activity is not attack activity, the activity continues to its destination, e.g., internally accessible resources 1230. Only in situations where the one or more security microservices 1218 determines there are no security issues with the traffic will the activity be sent across path 1234 to internally accessible resources 1230.

The security microservices checking the integrity and security of network traffic being passed through the network environment every time the data is passed between resources, both internally accessible resources and externally accessible resources, provides a benefit over traditional security systems. In traditional security systems, after the attack activity has reached an externally accessible resource, the attack activity is free to move about both externally accessible and internally accessible resources, resulting in significantly greater risks.

In one example, activity from attackers 1210 is indistinguishable from legitimate traffic sent from users 1212 when it is directed to externally accessible resources 1220 and the one or more security microservices 1218 may not determine the activity to be attack activity. However, when attackers 1210 attempt to direct the activity from externally accessible resources 1220 to internally accessible resources 1230, the one or more security microservices 1218, in its second evaluation, recognize that the direction of traffic is irregular for the type of data traffic and flag the activity as not legitimate (e.g., attack activity). In this manner, the activity sent from externally accessible resources 1220 to internally accessible resources 1230 is determined to be attack activity, even if the one or more security microservices 1218 are not aware that externally accessible resources 1220 is compromised.

Figure 13:
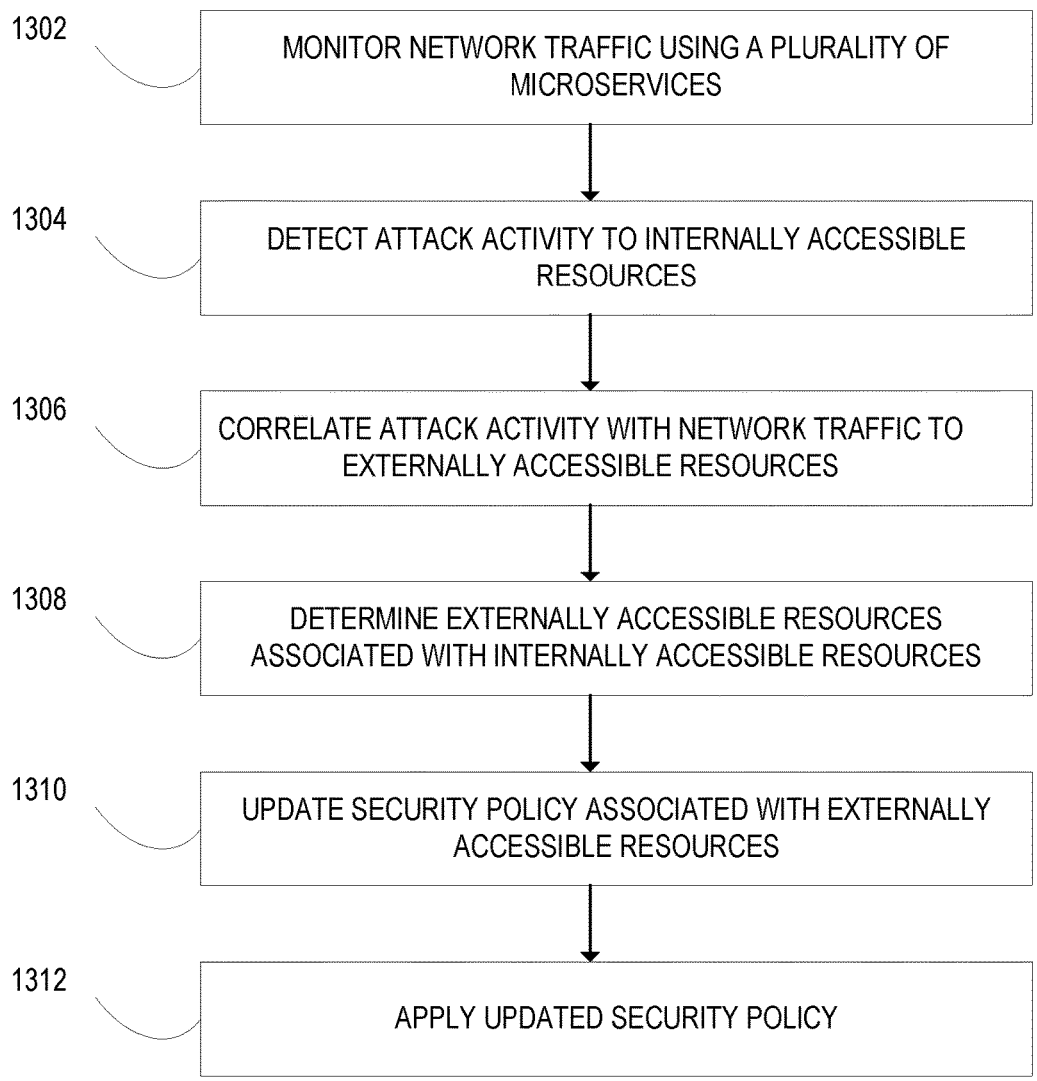
FIG. 13 is a flow diagram illustrating an example process for updating security policies in response to detecting activity through a networked environment in accordance with the disclosed embodiments.

FIG. 13 is a flow diagram illustrating an example process for updating security policies in response to detecting activity through a networked environment in accordance with an embodiment. For ease of understanding, the description of FIG. 13 below references components of the networked environment of FIG. 12, however, it is not limited to those components. Further, the actions below are performed by one or more security microservices and/or one or more interface microservices. As such, a single security microservice may perform an action, or two more security services may perform the action either independently, or in conjunction. At block 1302, one or more security microservices (e.g., one or more security microservices 1218) monitor network traffic throughout the networked environment. For example, one or more interface microservices 1221 in externally accessible resources 1220 intercept network traffic. The one or more interface microservices 1221 re-direct the network traffic to one or more security microservices 1218 for evaluation. When the one or more security microservices do not detect any security policy violations with the network traffic, the one or more security microservices re-direct the network traffic back to externally accessible resources.

At block 1304, one or more security microservices (e.g., one or more security microservices 1218) detect activity indicating an attack from a different level (e.g., north-south) to internally accessible resources (e.g., internally accessible resources 1230). In one embodiment, one or more security microservices detect attack activity directed to internally accessible resources at a second level of a hierarchy of resources, where the attack activity is directed from externally accessible resources at the first level of the hierarchy of resources. For example, one or more security microservices 1218 detect that network activity that passed through one or more security microservices 1218 to externally accessible resources 1220 is currently being directed to internally accessible resources 1230, where the type of network activity being sent is indicative of attack activity. In one example, the type of network activity is not typically sent between from a resource at the first level of the hierarchy of resources to a resource at the second level of the hierarchy of resources, and the occurrence is detected as an attack. In another example, the type of network activity violates a security policy regarding communications between externally accessible resources and internally accessible resources.

At block 1306, one or more security microservices (e.g., one or more security microservices 1218) correlate the attack activity with the network traffic to externally accessible resources (e.g., externally accessible resources 1220). For example, one or more security microservices 1218 determine an IP address, or other identifier, for externally accessible resources 1220 as the initial point of entry of the attack activity to the networked environment. In one embodiment, one or more security microservices traverse a path of the attack activity through the networked environment to determine the externally accessible resources interfacing with an external network. Because the determined externally accessible resources was the first resource to interface with the external network, security microservices identify it as the source of the compromise to the networked environment.

In one embodiment, one or more security microservices (e.g., one or more security microservices 1218) indicate externally accessible resources (e.g., externally accessible resources 1220) as being in a compromised state. In one embodiment, one or more security microservices make this determination based on the flow of the attack activity to the externally accessible resources, even though the attack activity may have been previously allowed to pass to externally accessible resources in a previous analysis by one or more security microservices, for example as described above in block 1302.

In one embodiment, one or more security microservices (e.g., one or more security microservices 1218) determine additional externally accessible resources having the same configuration as externally accessible resources that sent the attack activity.

At block 1308, the one or more security microservices (e.g., one or more security microservices 1218) determine externally accessible resources that are associated with internally accessible resources (e.g., internally accessible resources 1230). For example, the one or more security microservices 1218 determine the externally accessible resources that interact (e.g., send and receive data) with internally accessible resources 1230, or additional externally accessible resources having the same configuration as internally accessible resources 1230.

At block 1310, the one or more security microservices (e.g., one or more security microservices 1218) update a security policy associated with the externally accessible resources within the networked environment. The one or more security microservices 1218, in response to detecting a north-south attack (e.g., attack activity directed between externally accessible resources at different hierarchical level), updates security policies associated with externally accessible resources to reduce the risk of the attack activity spreading in the east-west direction (e.g., between resources at the same level of the hierarchy of resources).

At block 1312, the one or more security microservices (e.g., one or more security microservices 1218) apply the security policy to the externally accessible resources.

In one embodiment, application of security policy comprises configuring the security policy of one or more security microservices. In one embodiment, the application of security policy comprises reconfiguring an existing security microservice. In one embodiment, application of security policy comprises instantiating a new security microservice and configuring the new security microservice through the application of a security policy. Instantiating a new security microservice may include the instantiation and configuration of a new interface microservice.

In one embodiment, the one or more security microservices additionally update a security policy associated with network activity sent between resources at different hierarchical level.

Figure 14:
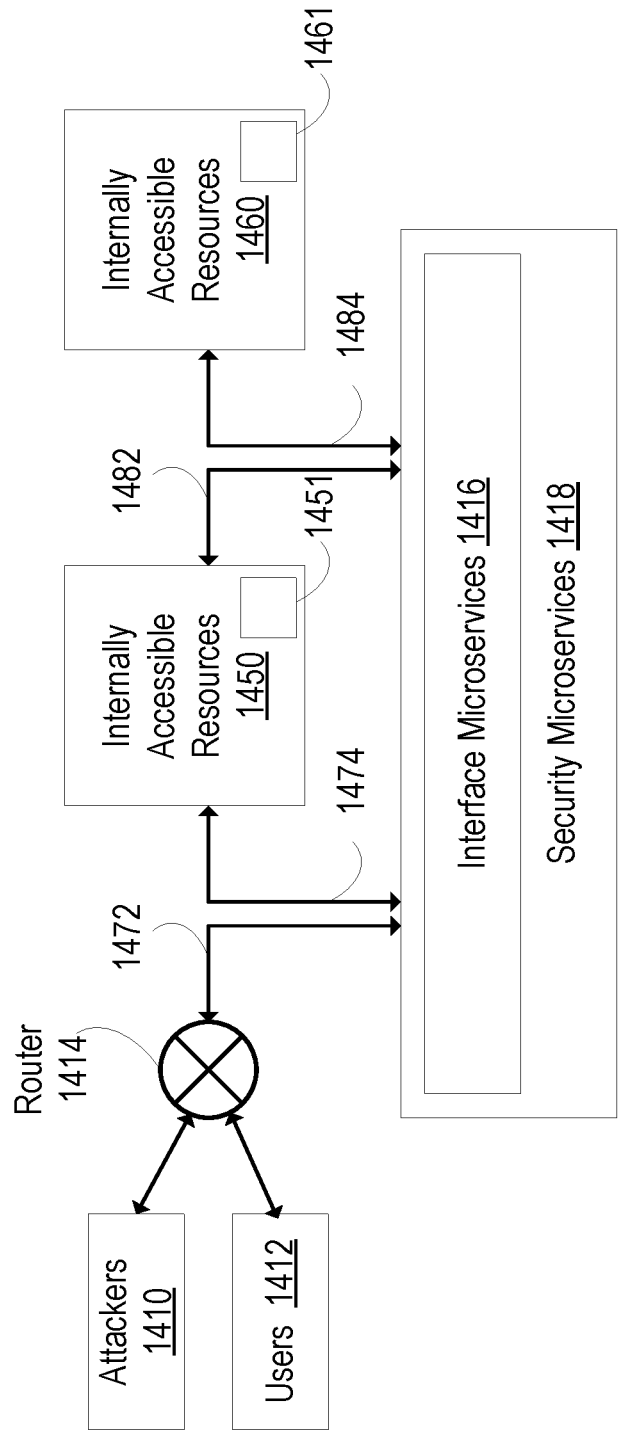
FIG. 14 is a flow diagram illustrating an example process for updating security policies in response to detecting activity through a networked environment in accordance with the disclosed embodiments.

FIG. 14 illustrates security microservices 1418 intercepting east-west activity between internally accessible resources within a networked environment in accordance with the disclosed embodiments. The networked environment includes router 1414, internally accessible resources 1450 and 1460, and one or more security microservices 1418. In one example, attackers 1410 send activity across the network that reaches internally accessible resources 1450. In one embodiment, internally accessible resources 1450 received the activity from externally accessible resources (not pictured) after the activity was evaluated and passed through router 1414 and the one or more security microservices 1418 (e.g., via paths 1472 and 1474. In this scenario, attackers 1410 now have access to internally accessible resources 1450, and can use the access to try to send the activity to other internally accessible resources across path 1482. However, because internally accessible resources 1460 also have one or more interface microservices 1461 linked to the one or more security microservices 1418, the activity sent over path 1482 is intercepted by the one or more interface microservices 1461 in internally accessible resources 1460 and sent to interface microservices 1416 to allow the one or more security microservices 1418 to perform one or more security services on the activity. In another embodiment, when internally accessible resources 1450 attempt to send the activity to internally accessible resources 1460, the one or more interface microservices 1451 in internally accessible resources 1450 intercept the activity and re-direct the activity to path 1482. Continuing the example, through the second evaluation by the one or more security microservices 1418, the one or more security microservices 1418 determine that the activity is, in fact, attack activity and can indicate that internally accessible resources 1450 is compromised. If the one or more security microservices 1418 determine the activity is not attack activity, the activity continues to its destination, e.g., internally accessible resources 1460. Only in situations where the one or more security microservices 1418 determine there are no security issues with the traffic will the activity be sent across path 1484 to internally accessible resources 1460.

In this manner, the activity sent from internally accessible resources 1450 to internally accessible resources 1460 is determined to be attack activity, even if security microservices 1418 is not aware that internally accessible resources 1450 and externally accessible resources that sent the attack activity to internally accessible resources 1450 are compromised.

Figure 15:
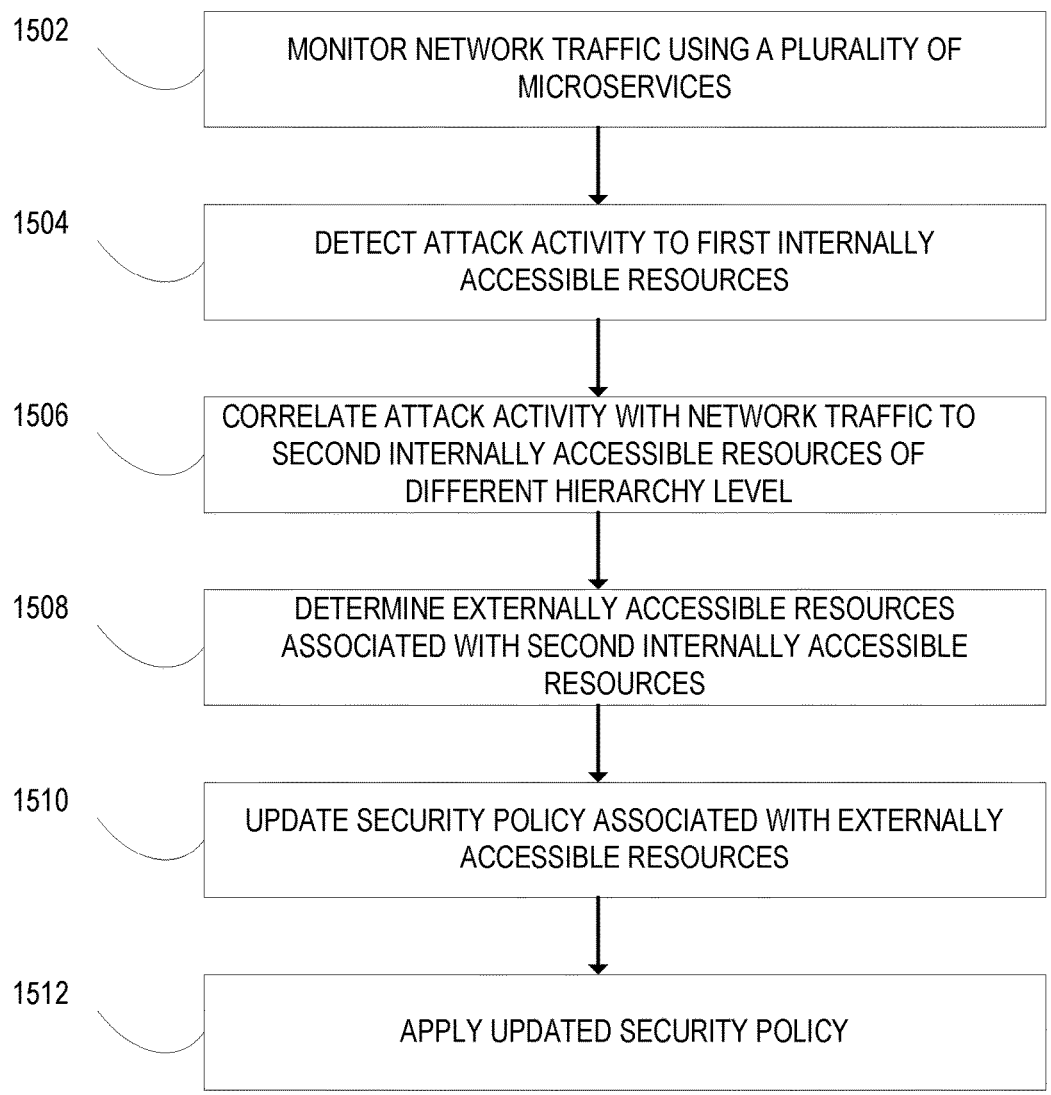
FIG. 15 is a flow diagram illustrating an example process for updating security policies in response to detecting activity through a networked environment in accordance with the disclosed embodiments.

FIG. 15 is a flow diagram illustrating an example process for updating security policies in response to detecting activity through a networked environment in accordance with an embodiment. For ease of understanding, the description of FIG. 15 below references components of the networked environment of FIG. 14, however, it is not limited to those components. Further, the actions below are performed by one or more security microservices and/or one or more interface microservices. As such, a single security microservice may perform an action, or two more security services may perform the action either independently, or in conjunction. One or more security microservices (e.g., one or more security microservices 1418) monitor network traffic throughout the networked environment. For example, one or more interface microservices 1451 in internally accessible resources 1450 intercept network traffic. The one or more interface microservices 1451 re-direct the network traffic to security microservices 1418 for evaluation. When the one or more security microservices do not detect any security policy violations with the network traffic, the one or more security microservices re-direct the network traffic back to internally accessible resources.

At block 1504, one or more security microservices (e.g., one or more security microservices 1418) detect activity indicating an attack from a different level (e.g., north-south) to internally accessible resources (e.g., internally accessible resources 1460). In one embodiment, one or more security microservices detect attack activity directed to internally accessible resources at a level of a hierarchy of resources, where the attack activity is directed from internally accessible resources at the different, lower level of the hierarchy of resources. For example, one or more security microservices 1418 detect that network activity that passed through one or more security microservices 1418 to internally accessible resources 1450 is currently being directed to internally accessible resources 1460, where the type of network activity being sent is indicative of attack activity. In one example, the type of network activity is not typically sent between from a resource at a lower level of the hierarchy of resources to a resource at a higher level of the hierarchy of resources, or between levels of the hierarchy of resources generally, and the occurrence is detected as an attack. In another example, the type of network activity violates a security policy regarding communications between internally accessible resources.

At block 1506, one or more security microservices (e.g., one or more security microservices 1418) correlate the attack activity with the network traffic to internally accessible resources of a different hierarchy level. For example, one or more security microservices 1418 determine an IP address, or other identifier, for internally accessible resources 1450 as the source of the attack activity to internally accessible resources 1460. In one embodiment, one or more security microservices further traverse a path of the attack activity through the networked environment to determine the externally accessible resources interfacing with an external network. Because the determined externally accessible resources was the first resource to interface with the external network, security microservices identify it as the source of the compromise to the networked environment.

In one embodiment, one or more security microservices (e.g., one or more security microservices 1418) indicate internally accessible resources (e.g., internally accessible resources 1450) at the different hierarchy level as being in a compromised state. In one embodiment, one or more security microservices make this determination based on the flow of the attack activity to the internally accessible resources, even though the attack activity may have been previously allowed to pass to internally accessible resources in a previous analysis by one or more security microservices.

At block 1508, the one or more security microservices (e.g., one or more security microservices 1418) determine externally accessible resources that are associated with the internally accessible resources (e.g., internally accessible resources 1450). For example, the one or more security microservices 1418 determine the externally accessible resources that interact (e.g., send and receive data) with internally accessible resources 1450, or additional externally accessible resources having the same configuration as internally accessible resources 1450.

At block 1510, the one or more security microservices (e.g., one or more security microservices 1418) update a security policy associated with the externally accessible resources within the networked environment. The one or more security microservices 1418, in response to detecting a north-south attack (e.g., attack activity directed between internally accessible resources at different hierarchical level), updates security policies associated with externally accessible resources to reduce the risk of the attack activity spreading in the east-west direction (e.g., between resources at the same level of the hierarchy of resources).

At block 1512, the one or more security microservices (e.g., one or more security microservices 1418) apply the security policy to the externally accessible resources.

In one embodiment, application of security policy comprises configuring the security policy of one or more security microservices. In one embodiment, the application of security policy comprises reconfiguring an existing security microservice. In one embodiment, application of security policy comprises instantiating a new security microservice and configuring the new security microservice through the application of a security policy. Instantiating a new security microservice may include the instantiation and configuration of a new interface microservice.

In one embodiment, the one or more security microservices additionally update a security policy associated with network activity sent between resources at different hierarchical level.

In one embodiment, the security microservices additionally update a security policy associated with network activity sent between resources at different hierarchical levels. Policy updates may include changing or updating rules associated with processing network traffic within the security service. In one embodiment, the security service acts as a honeypot and utilizes the methods described to detect and analyze new attacks in a network. In one embodiment, the honeypot exposes certain externally accessible resources with known weaknesses to attack activity to analyze the effects of the attack on internally accessible resources and to create or improve detection signatures. In a non-limiting example, a web server with known vulnerabilities and/or exposed to attacks on a public network may be monitored by the security service as it interacts with an application tier or other internally accessible resources. The analysis of traffic patterns from the compromised externally accessible resource to the uncompromised internally accessible resource may be used to improve detection of the attack on the externally accessible resources. Similarly, analysis of traffic patterns between internally accessible resources, of the same and different hierarchy levels, may be used to improve detection of both the attack on the externally accessible resource and the subsequent attack on the internally accessible resource. In such embodiments, improved detection can prevent future attacks or further movement of the attack activity through resources. For example, the system can send notification messages indicating detected threats, potential attackers, and/or potential targets.

In one embodiment, correlation of activity is achieved through temporal correlation of activity such as clustering network traffic in time. In another embodiment, correlation of network activity is achieved through network address clustering such as calculating and ranking the overlap of IP address paths among network devices. In another embodiment, correlation of network activity is achieved through identity clustering such as ranking applications use and traffic patterns per user and determining outliers for users in the same role (such as marketing, engineering, sales, executive, etc.).

In one embodiment, correlation of activity is achieved through identification of elements of the compromised resource such as application ports or protocols, application stack components and communications characteristics of the physical machine, virtual machine or container environment. Communication characteristics may include properties such as interface identity such that activity on a first interface may be correlated to activity on a second interface. As a non-limiting example, incoming network traffic on a first interface targeting a known application port may be correlated to outgoing traffic on a second interface targeting the same application port and said correlation used to indicate east-west activity among resources at the same hierarchy level. Interfaces used for such analysis may be physical or virtual.

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 16:
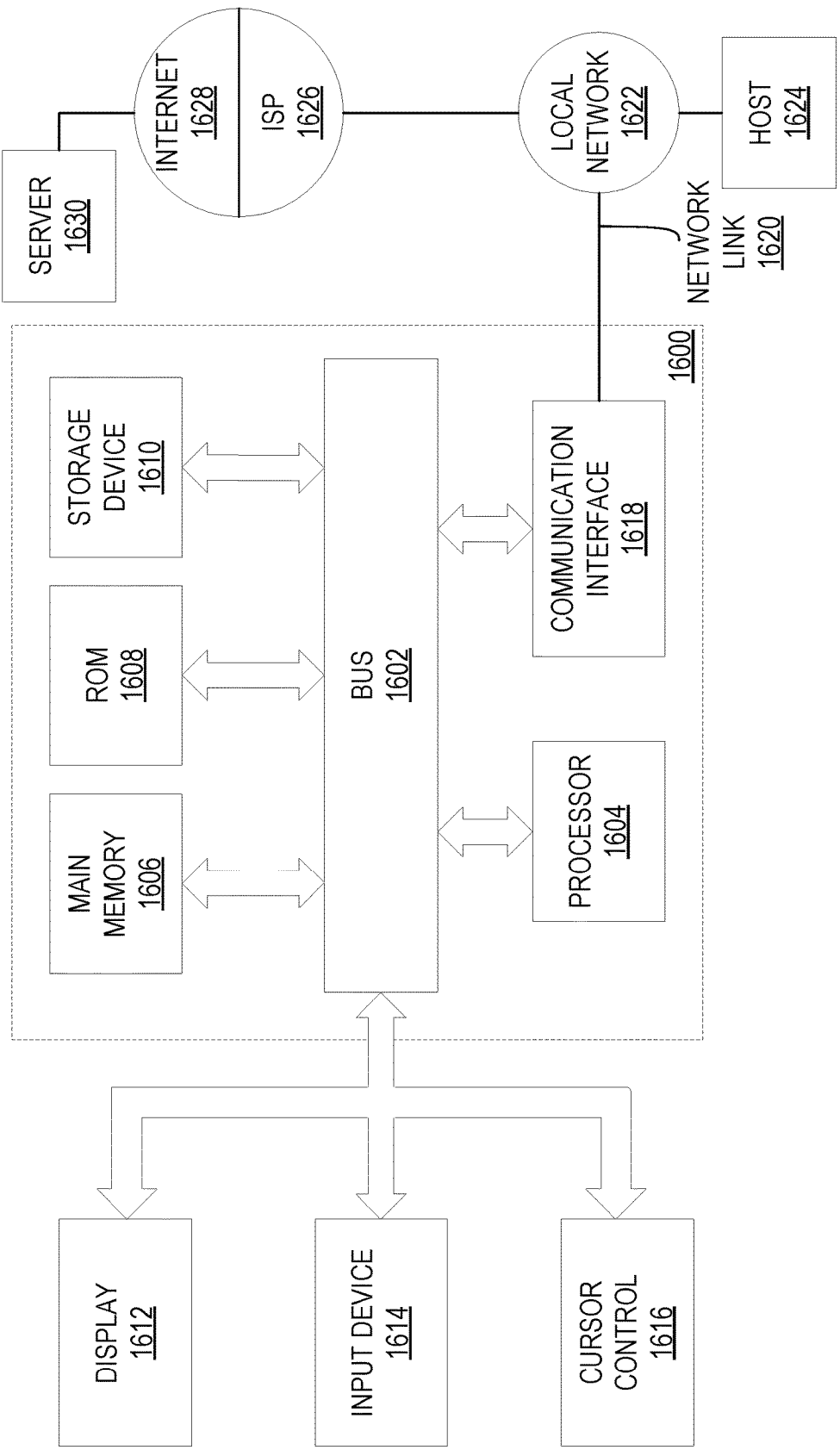
FIG. 16 is a block diagram that illustrates a computer system utilized in implementing the above-described techniques in accordance with the disclosed embodiments.

FIG. 16 is a block diagram that illustrates a computer system 1600 utilized in implementing the above-described techniques in accordance with some of the disclosed embodiments. Computer system 1600 may be, for example, a desktop computing device, laptop computing device, tablet, smartphone, server appliance, computing mainframe, multimedia device, handheld device, networking apparatus, or any other suitable device.

Computer system 1600 includes one or more buses 1602 or other communication mechanism for communicating information, and one or more hardware processors 1604 coupled with buses 1602 for processing information. Hardware processors 1604 may be, for example, general purpose microprocessors. Buses 1602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1600 also includes a main memory 1606, such as a random access memory (RAM) or other dynamic or volatile storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 a special-purpose machine that is customized to perform the operations specified in the instructions.

Computer system 1600 further includes one or more read only memories (ROM) 1608 or other static storage devices coupled to bus 1602 for storing static information and instructions for processor 1604. One or more storage devices 1610, such as a solid-state drive (SSD), magnetic disk, optical disk, or other suitable non-volatile storage device, is provided and coupled to bus 1602 for storing information and instructions.

Computer system 1600 may be coupled via bus 1602 to one or more displays 1612 for presenting information to a computer user. For instance, computer system 1600 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1612.

One or more input devices 1614 are coupled to bus 1602 for communicating information and command selections to processor 1604. One example of an input device 1614 is a keyboard, including alphanumeric and other keys. Another type of user input device 1614 is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. Yet other examples of suitable input devices 1614 include a touch-screen panel affixed to a display 1612, cameras, microphones, accelerometers, motion detectors, and/or other sensors. In an embodiment, a network-based input device 1614 may be utilized. In such an embodiment, user input and/or other information or commands may be relayed via routers and/or switches on a Local Area Network (LAN) or other suitable shared network, or via a peer-to-peer network, from the input device 1614 to a network link 1620 on the computer system 1600.

A computer system 1600 may implement techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1600 can receive the data on the network and demodulate the signal to decode the transmitted instructions. Appropriate circuitry can then place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

A computer system 1600 may also include, in an embodiment, one or more communication interfaces 1618 coupled to bus 1602. A communication interface 1618 provides a data communication coupling, typically two-way, to a network link 1620 that is connected to a local network 1622. For example, a communication interface 1618 may be an integrated services digital network (ISDN) card, cable modem, satellite modem, or a modem to provide a data communication connection to a corresponding type of telephone line. As another example, the one or more communication interfaces 1618 may include a local area network (LAN) card to provide a data communication connection to a compatible LAN. As yet another example, the one or more communication interfaces 1618 may include a wireless network interface controller, such as a 802.11-based controller, Bluetooth controller, Long Term Evolution (LTE) modem, and/or other types of wireless interfaces. In any such implementation, communication interface 1618 sends and receives electrical, electromagnetic, or optical signals that carry digital data streams representing various types of information.

Network link 1620 typically provides data communication through one or more networks to other data devices. For example, network link 1620 may provide a connection through local network 1622 to a host computer 1624 or to data equipment operated by a Service Provider 1626. Service Provider 1626, which may for example be an Internet Service Provider (ISP), in turn provides data communication services through a wide area network, such as the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

In an embodiment, computer system 1600 can send messages and receive data, including program code and/or other types of instructions, through the network(s), network link 1620, and communication interface 1618. In the Internet example, a server 1630 might transmit a requested code for an application program through Internet 1628, ISP 1626, local network 1622 and communication interface 1618. The received code may be executed by processor 1604 as it is received, and/or stored in storage device 1610, or other non-volatile storage for later execution. As another example, information received via a network link 1620 may be interpreted and/or processed by a software component of the computer system 1600, such as a web browser, application, or server, which in turn issues instructions based thereon to a processor 1604, possibly via an operating system and/or other intermediate layers of software components.

In an embodiment, some or all of the systems described herein may be or comprise server computer systems, including one or more computer systems 1600 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer-readable storage medium, storing software instructions, which when executed by one or more processors cause performance of any of the foregoing methods.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Examples of embodiments of methods, apparatuses, systems, etc. detailed herein are listed below.

In some embodiments, a computer-implemented method to update a security policy comprises: monitoring network traffic using a plurality of microservices; detecting that the monitored network traffic indicates activity directed to a first externally accessible resource at a first level of resources in an internal network, the activity directed from a second externally accessible resource at the first level of resources in the internal network; in response to detecting the network traffic indicates the activity directed to the first externally accessible resource at the first level of resources in the internal network, correlating the activity with the second externally accessible resource; determining internally accessible resources at a second level of resources in the internal network associated with the second externally accessible resource at the first level of resources in the internal network; updating a security policy associated with the internally accessible resources, the security policy regarding communications from externally accessible resources at the first level of resources in the internal network to the internally accessible resources at the second level of resources in the internal network; and applying the updated security policy.

In some embodiments, one or more of the following applies: 1) monitoring the network traffic using the plurality of microservices comprises: intercepting the network traffic directed to the first externally accessible resource at an interface microservice associated with a security microservice prior to the network traffic being received by the first externally accessible resource; 2) detecting that the monitored network traffic indicates the activity directed to the first externally accessible resource at the first level of resources in the internal network comprises: determining that the activity directed to the first externally accessible resource violates a security policy for communications from a first resource at the first level of resources in the internal network to a second resource at the first level of resources in the internal network; 3) correlating the activity with an externally accessible resource comprises: traversing a path of the activity through the internal network to determine the externally accessible resource interfacing with an external network; and indicating the determined externally accessible resource is in a compromised state; 4) the method further comprises: updating the security policy associated with the externally accessible resources, the security policy regarding communications between externally accessible resources; and 5) applying the updated security policy comprises one or both of configuring a new security microservice and reconfiguring an existing security microservice.

In some embodiments, one or more non-transitory computer-readable storage media store instructions which, when executed by one or more hardware processors, cause performance of a method to update a security policy, the method comprising: monitoring network traffic using a plurality of microservices; detecting that the monitored network traffic indicates activity directed to a first externally accessible resource at a first level of resources in an internal network, the activity directed from a second externally accessible resource at the first level of resources in the internal network; in response to detecting the network traffic indicates the activity directed to the first externally accessible resource at the first level of resources in the internal network, correlating the activity with the second externally accessible resource; determining internally accessible resources at a second level of resources in the internal network associated with the second externally accessible resource at the first level of resources in the internal network; updating a security policy associated with the internally accessible resources, the security policy regarding communications from externally accessible resources at the first level of resources in the internal network to the internally accessible resources at the second level of resources in the internal network; and applying the updated security policy.

In some embodiments, one or more of the following applies: 1) monitoring the network traffic using the plurality of microservices comprises: intercepting the network traffic directed to the first externally accessible resource at an interface microservice associated with a security microservice prior to the network traffic being received by the first externally accessible resource; 2) detecting that the monitored network traffic indicates the activity directed to the first externally accessible resource at the first level of resources in the internal network comprises: determining that the activity directed to the first externally accessible resource violates a security policy for communications from a first resource at the first level of resources in the internal network to a second resource at the first level of resources in the internal network; 3) correlating the activity with an externally accessible resource comprises: traversing a path of the activity through the internal network to determine the externally accessible resource interfacing with an external network; and indicating the determined externally accessible resource is in a compromised state; 4) the method further comprises: updating the security policy associated with the externally accessible resources, the security policy regarding communications between externally accessible resources; and 5) applying the updated security policy comprises one or both of configuring a new security microservice and reconfiguring an existing security microservice.

In some embodiments, an apparatus comprises: one or more hardware processors; and memory coupled to the one or more hardware processors, the memory storing instructions which, when executed by the one or more hardware processors, causes the apparatus to: monitor network traffic using a plurality of microservices; detect that the monitored network traffic indicates activity directed to a first externally accessible resource at a first level of resources in an internal network, the activity directed from a second externally accessible resource at the first level of resources in the internal network; in response to detecting the network traffic indicates the activity directed to the first externally accessible resource at the first level of resources in the internal network, correlate the activity with the second externally accessible resource; determine internally accessible resources at a second level of resources in the internal network associated with the second externally accessible resource at the first level of resources in the internal network; update a security policy associated with the internally accessible resources, the security policy regarding communications from externally accessible resources at the first level of resources in the internal network to the internally accessible resources at the second level of resources in the internal network; and apply the updated security policy.

In some embodiments, a computer-implemented method to update a security policy comprises: monitoring network traffic using a plurality of microservices; detecting that the monitored network traffic indicates activity directed to an internally accessible resource at a second level of resources in an internal network, the activity directed from an externally accessible resource at a first level of resources in the internal network; in response to detecting the network traffic indicates the activity directed to the internally accessible resource, correlating the activity with the externally accessible resource; determining externally accessible resources at the first level of the resources in the internal network associated with the internally accessible resource at the second level of resources in the internal network; updating the security policy associated with the externally accessible resources, the security policy regarding communications between externally accessible resources; and applying the updated security policy.

In some embodiments, one or more of the following applies: 1) monitoring the network traffic using the plurality of microservices comprises: intercepting the network traffic directed to the internally accessible resource at an interface microservice associated with a security microservice prior to the network traffic being received by the internally accessible resource; 2) detecting that the monitored network traffic indicates the activity directed to the internally accessible resources at the second level of resources in the internal network comprises: determining that the activity directed to the internally accessible resources violates a security policy for communications from a first resource at the first level of resources in the internal network to a second resource at the second level of resources in the internal network; 3) correlating the activity with an externally accessible resource comprises: traversing a path of the activity through the internal network to determine the externally accessible resource interfacing with an external network; and indicating the determined externally accessible resource is in a compromised state; 4) the internally accessible resources at the second level of resources in the internal network are not reachable directly from an external network; 5) the method further comprises: updating the security policy associated with the internally accessible resources, the security policy regarding communications from the externally accessible resources to the internally accessible resources; and 6) applying the updated security policy comprises one or both of configuring a new security microservice and reconfiguring an existing security microservice.

In some embodiments, one or more non-transitory computer-readable storage media store instructions which, when executed by one or more hardware processors, cause performance of a method to update a security policy, the method comprising: monitoring network traffic using a plurality of microservices; detecting that the monitored network traffic indicates activity directed to an internally accessible resource at a second level of resources in an internal network, the activity directed from an externally accessible resource at a first level of resources in the internal network; in response to detecting the network traffic indicates the activity directed to the internally accessible resource, correlating the activity with the externally accessible resource; determining externally accessible resources at the first level of the resources in the internal network associated with the internally accessible resource at the second level of resources in the internal network; updating the security policy associated with the externally accessible resources, the security policy regarding communications between externally accessible resources; and applying the updated security policy.

In some embodiments, one or more of the following applies: 1) monitoring the network traffic using the plurality of microservices comprises: intercepting the network traffic directed to the internally accessible resource at an interface microservice associated with a security microservice prior to the network traffic being received by the internally accessible resource; 2) detecting that the monitored network traffic indicates the activity directed to the internally accessible resources at the second level of resources in the internal network comprises: determining that the activity directed to the internally accessible resources violates a security policy for communications from a first resource at the first level of resources in the internal network to a second resource at the second level of resources in the internal network; 3) correlating the activity with an externally accessible resource comprises: traversing a path of the activity through the internal network to determine the externally accessible resource interfacing with an external network; and indicating the determined externally accessible resource is in a compromised state; 4) the internally accessible resources at the second level of resources in the internal network are not reachable directly from an external network; 5) the method further comprises: updating the security policy associated with the internally accessible resources, the security policy regarding communications from the externally accessible resources to the internally accessible resources; and 6) applying the updated security policy comprises one or both of configuring a new security microservice and reconfiguring an existing security microservice.

In some embodiments, an apparatus comprises: one or more hardware processors; and memory coupled to the one or more hardware processors, the memory storing instructions which, when executed by the one or more hardware processors, causes the apparatus to: monitor network traffic using a plurality of microservices; detect that the monitored network traffic indicates activity directed to an internally accessible resource at a second level of resources in an internal network, the activity directed from an externally accessible resource at a first level of resources in the internal network; in response to detecting the network traffic indicates the activity directed to the internally accessible resource, correlate the activity with the externally accessible resource; determining externally accessible resources at the first level of the resources in the internal network associated with the internally accessible resource at the second level of resources in the internal network; update the security policy associated with the externally accessible resources, the security policy regarding communications between externally accessible resources; and apply the updated security policy.

What is claimed is:

1. A computer-implemented method to update a security policy, the method comprising:
    monitoring network traffic using a plurality of microservices;
    detecting that the monitored network traffic indicates activity directed to a first externally accessible resource at a first level of resources in an internal network, the activity directed from a second externally accessible resource at the first level of resources in the internal network, the first and second externally accessible resources reachable via an interface configured to receive the network traffic from outside the internal network;
    in response to detecting the network traffic indicates the activity directed to the first externally accessible resource at the first level of resources in the internal network, correlating the activity with the second externally accessible resource;
    determining internally accessible resources at a second level of resources in the internal network associated with the second externally accessible resource at the first level of resources in the internal network, the internally accessible resources not reachable directly from an external network;
    updating a security policy associated with the internally accessible resources, the security policy regarding communications from externally accessible resources at the first level of resources in the internal network to the internally accessible resources at the second level of resources in the internal network; and
    applying the updated security policy to subsequent network traffic directed to the internally accessible resources.

2. The method of claim 1, wherein monitoring the network traffic using the plurality of microservices comprises:
    intercepting the network traffic directed to the first externally accessible resource at an interface microservice associated with a security microservice prior to the network traffic being received by the first externally accessible resource.

3. The method of claim 1, wherein detecting that the monitored network traffic indicates the activity directed to the first externally accessible resource at the first level of resources in the internal network comprises:
    determining that the activity directed to the first externally accessible resource violates a security policy for communications from a first resource at the first level of resources in the internal network to a second resource at the first level of resources in the internal network.

4. The method of claim 1, wherein correlating the activity with an externally accessible resource comprises:
    traversing a path of the activity through the internal network to determine the externally accessible resource interfacing with the external network; and
    indicating the determined externally accessible resource is in a compromised state.

5. The method of claim 1, further comprising:
    updating the security policy associated with the externally accessible resources, the security policy regarding communications between externally accessible resources.

6. The method of claim 1, wherein applying the updated security policy comprises one or both of configuring a new security microservice and reconfiguring an existing security microservice.

7. One or more non-transitory computer-readable storage media storing instructions which, when executed by one or more hardware processors, cause performance of a method to update a security policy, the method comprising:
    monitoring network traffic using a plurality of microservices;
    detecting that the monitored network traffic indicates activity directed to a first externally accessible resource at a first level of resources in an internal network, the activity directed from a second externally accessible resource at the first level of resources in the internal network, the first and second externally accessible resources reachable via an interface configured to receive the network traffic from outside the internal network;
    in response to detecting the network traffic indicates the activity directed to the first externally accessible resource at the first level of resources in the internal network, correlating the activity with the second externally accessible resource;
    determining internally accessible resources at a second level of resources in the internal network associated with the second externally accessible resource at the first level of resources in the internal network, the internally accessible resources not reachable directly from an external network;
    updating the security policy associated with the internally accessible resources, the security policy regarding communications from externally accessible resources at the first level of resources in the internal network to the internally accessible resources at the second level of resources in the internal network; and applying the updated security policy to subsequent network traffic directed to the internally accessible resources.

8. The one or more non-transitory computer-readable storage media of claim 7, wherein monitoring the network traffic using the plurality of microservices comprises:

intercepting the network traffic directed to the first externally accessible resource at an interface microservice associated with a security microservice prior to the network traffic being received by the first externally accessible resource.

9. The one or more non-transitory computer-readable storage media of claim 7, wherein detecting that the monitored network traffic indicates the activity directed to the first externally accessible resource at the first level of resources in the internal network comprises:

determining that the activity directed to the first externally accessible resource violates a security policy for communications from a first resource at the first level of resources in the internal network to a second resource at the first level of resources in the internal network.

10. The one or more non-transitory computer-readable storage media of claim 7, wherein correlating the activity with an externally accessible resource comprises:

traversing a path of the activity through the internal network to determine the externally accessible resource interfacing with the external network; and indicating the determined externally accessible resource is in a compromised state.

11. The one or more non-transitory computer-readable storage media of claim 7, further comprising:

updating the security policy associated with the externally accessible resources, the security policy regarding communications between the externally accessible resources.

12. The one or more non-transitory computer-readable storage media of claim 7, wherein applying the updated security policy comprises one or both of configuring a new security microservice and reconfiguring an existing security microservice.

13. An apparatus, comprising:

one or more hardware processors;

memory coupled to the one or more hardware processors, the memory storing instructions which, when executed by the one or more hardware processors, causes the apparatus to:

monitor network traffic using a plurality of microservices;

detect that the monitored network traffic indicates activity directed to a first externally accessible resource at a first level of resources in an internal network, the activity directed from a second externally accessible resource at the first level of resources in the internal network, the first and second externally accessible resources reachable via an interface configured to receive the network traffic from outside the internal network;

in response to detecting the network traffic indicates the activity directed to the first externally accessible resource at the first level of resources in the internal network, correlate the activity with the second externally accessible resource;

determine internally accessible resources at a second level of resources in the internal network associated with the second externally accessible resource at the first level of resources in the internal network, the internally accessible resources not reachable directly from an external network;

update a security policy associated with the internally accessible resources, the security policy regarding communications from externally accessible resources at the first level of resources in the internal network to the internally accessible resources at the second level of resources in the internal network; and apply the updated security policy to subsequent network traffic directed to the internally accessible resources.

14. A computer-implemented method to update a security policy, the method comprising:

monitoring network traffic using a plurality of microservices;

detecting that the monitored network traffic indicates activity directed to an internally accessible resource at a second level of resources in an internal network, the activity directed from an externally accessible resource at a first level of resources in the internal network, the internally accessible resource not reachable directly from an external network;

in response to detecting the network traffic indicates the activity directed to the internally accessible resource, correlating the activity with the externally accessible resource;

determining externally accessible resources at the first level of resources in the internal network associated with the internally accessible resource at the second level of resources in the internal network, the externally accessible resources reachable via an interface configured to receive the network traffic from outside the internal network;

updating the security policy associated with the externally accessible resources, the security policy regarding communications between externally accessible resources; and applying the updated security policy to subsequent network traffic directed to the externally accessible resources.

15. The method of claim 14, wherein monitoring the network traffic using the plurality of microservices comprises:

intercepting the network traffic directed to the internally accessible resource at an interface microservice associated with a security microservice prior to the network traffic being received by the internally accessible resource.

16. The method of claim 14, wherein detecting that the monitored network traffic indicates the activity directed to the internally accessible resource at the second level of resources in the internal network comprising:

determining that the activity directed to the internally accessible resource violates a security policy for communications from a first resource at the first level of resources in the internal network to a second resource at the second level of resources in the internal network.

17. The method of claim 14, wherein correlating the activity with the externally accessible resource comprises:

traversing a path of the activity through the internal network to determine the externally accessible resource interfacing with the external network; and indicating the determined externally accessible resource is in a compromised state.

18. The method of claim 14, further comprising:

updating the security policy associated with internally accessible resources, the security policy regarding communications from the externally accessible resources to the internally accessible resources.

19. The method of claim 14, wherein applying the updated security policy comprises one or both of configuring a new security microservice and reconfiguring an existing security microservice.

20. One or more non-transitory computer-readable storage media storing instructions which, when executed by one or more hardware processors, cause performance of a method to update a security policy, the method comprising:
   monitoring network traffic using a plurality of microservices;
   detecting that the monitored network traffic indicates activity directed to an internally accessible resource at a second level of resources in an internal network, the activity directed from an externally accessible resource at a first level of resources in the internal network, the internally accessible resource not reachable directly from an external network;
   in response to detecting the network traffic indicates the activity directed to the internally accessible resource, correlating the activity with the externally accessible resource;
   determining externally accessible resources at the first level of resources in the internal network associated with the internally accessible resource at the second level of resources in the internal network, the externally accessible resources reachable via an interface configured to receive the network traffic from outside the internal network;
   updating the security policy associated with the externally accessible resources, the security policy regarding communications between externally accessible resources; and
   applying the updated security policy to subsequent network traffic directed to the externally accessible resources.

21. The one or more non-transitory computer-readable storage media of claim 20, wherein monitoring the network traffic using the plurality of microservices comprises:
   intercepting the network traffic directed to the internally accessible resource at an interface microservice associated with a security microservice prior to the network traffic being received by the internally accessible resource.

22. The one or more non-transitory computer-readable storage media of claim 20, wherein detecting that the monitored network traffic indicates the activity directed to the internally accessible resource at the second level of resources in the internal network comprising:
   determining that the activity directed to the internally accessible resource violates a security policy for communications from a first resource at the first level of resources in the internal network to a second resource at the second level of resources in the internal network.

23. The one or more non-transitory computer-readable storage media of claim 20, wherein correlating the activity with the externally accessible resource comprises:
   traversing a path of the activity through the internal network to determine the externally accessible resource interfacing with the external network; and
   indicating the determined externally accessible resource is in a compromised state.

24. The one or more non-transitory computer-readable storage media of claim 20, further comprising:
   updating the security policy associated with internally accessible resources, the security policy regarding communications from the externally accessible resources to the internally accessible resources.

25. The one or more non-transitory computer-readable storage media of claim 20, wherein applying the updated security policy comprises one or both of configuring a new security microservice and reconfiguring an existing security microservice.

26. An apparatus, comprising:
   one or more hardware processors;
   memory coupled to the one or more hardware processors, the memory storing instructions which, when executed by the one or more hardware processors, causes the apparatus to:
   monitor network traffic using a plurality of microservices;
   detect that the monitored network traffic indicates activity directed to an internally accessible resource at a second level of resources in an internal network, the activity directed from an externally accessible resource at a first level of resources in the internal network, the internally accessible resource not reachable directly from an external network;
   in response to detecting the network traffic indicates the activity directed to the internally accessible resource, correlate the activity with the externally accessible resource;
   determine externally accessible resources at the first level of resources in the internal network associated with the internally accessible resource at the second level of resources in the internal network, the externally accessible resources reachable via an interface configured to receive the network traffic from outside the internal network;
   update a security policy associated with the externally accessible resources, the security policy regarding communications between externally accessible resources; and
   apply the updated security policy to subsequent network traffic directed to the externally accessible resources.

* * * * *